(12) United States Patent
Maesen et al.

(10) Patent No.: US 8,658,558 B2
(45) Date of Patent: Feb. 25, 2014

(54) HYDROCONVERSION MULTI-METALLIC CATALYST AND METHOD FOR MAKING THEREOF

(75) Inventors: Theodorus Maesen, Moraga, CA (US); Alexander E. Kuperman, Orinda, CA (US); Dennis Dykstra, Pinole, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 315 days.

(21) Appl. No.: 13/275,482

(22) Filed: Oct. 18, 2011

(65) Prior Publication Data

US 2012/0122653 A1   May 17, 2012

Related U.S. Application Data

(60) Provisional application No. 61/412,763, filed on Nov. 11, 2010.

(51) Int. Cl.
*B01J 27/051* (2006.01)

(52) U.S. Cl.
USPC ........... 502/220; 502/5; 502/218; 502/219; 502/221; 502/222; 502/223; 502/208; 502/209; 502/211; 502/212; 502/213

(58) Field of Classification Search
USPC ............. 502/5, 218–223, 208–209, 211–213
See application file for complete search history.

(56) References Cited

U.S. PATENT DOCUMENTS

| | | | |
|---|---|---|---|
| 4,298,499 A | 11/1981 | Imai | |
| 4,412,859 A | 11/1983 | Hatfield et al. | |
| 4,417,972 A | 11/1983 | Francis et al. | |
| 4,428,768 A | 1/1984 | Day | |
| 4,434,043 A | 2/1984 | Singhal et al. | |
| 4,444,655 A | 4/1984 | Shiroto et al. | |
| 4,464,477 A | 8/1984 | Bunger et al. | |
| 4,511,539 A | 4/1985 | Stephenson | |
| 4,556,644 A | 12/1985 | Erpenbach et al. | |
| 4,557,760 A | 12/1985 | Erpenbach et al. | |
| 4,557,821 A | 12/1985 | Lopez et al. | |
| 4,721,606 A | 1/1988 | Tilley | |
| 4,722,774 A | 2/1988 | Hyatt | |
| 4,762,812 A | 8/1988 | Lopez et al. | |
| 4,786,752 A | 11/1988 | Holzhauer et al. | |
| 4,910,175 A | 3/1990 | Michel et al. | |

(Continued)

FOREIGN PATENT DOCUMENTS

WO   WO 2012/064467   5/2012

OTHER PUBLICATIONS

U.S. Appl. No. 13/275,459, filed Oct. 18, 2011, Kuperman, et al.
U.S. Appl. No. 13/275,518, filed Oct. 18, 2011, Kuperman, et al.

(Continued)

*Primary Examiner* — Kaj K Olsen
*Assistant Examiner* — Pritesh Darji

(57) ABSTRACT

In a process for forming a bulk hydroprocessing catalyst by sulfiding a catalyst precursor made in a co-precipitation reaction, up to 60% of the metal precursor feeds do not react to form catalyst precursor and end up in the supernatant. In the present disclosure, the metals can be recovered in an electro-coagulation reactor, wherein portion of the metal residuals in the supernatant reacts with the electrodes to form a slurry containing insoluble metal compounds. The insoluble metal compounds are isolated and recovered, forming an effluent stream. The insoluble metal compounds and/or the effluent stream can be further treated to form at least a metal precursor feed which can be used in the co-precipitation reaction.

28 Claims, 8 Drawing Sheets

(56) References Cited

U.S. PATENT DOCUMENTS

| | | |
|---|---|---|
| 4,913,736 A | 4/1990 | Gimzeski |
| 5,013,453 A | 5/1991 | Walker |
| 5,030,274 A | 7/1991 | Ward |
| 5,099,047 A | 3/1992 | Sato et al. |
| 5,169,503 A | 12/1992 | Baughman et al. |
| 5,209,840 A | 5/1993 | Sherwood, Jr. et al. |
| 5,215,652 A | 6/1993 | Epperly et al. |
| 5,230,791 A | 7/1993 | Sherwood, Jr. |
| 5,324,417 A | 6/1994 | Harandi |
| 5,362,382 A | 11/1994 | Heck et al. |
| 5,364,822 A | 11/1994 | Carey |
| 5,384,301 A | 1/1995 | Flytzani-Stephanopoulos et al. |
| 5,466,876 A | 11/1995 | McClarron et al. |
| 5,500,198 A | 3/1996 | Liu et al. |
| 6,165,934 A | 12/2000 | Gardner et al. |
| 6,455,018 B1 | 9/2002 | Cuif |
| 6,551,378 B2 | 4/2003 | Farone et al. |
| 6,770,249 B1 | 8/2004 | Hoboy et al. |
| 7,193,117 B2 | 3/2007 | Wachs et al. |
| 7,273,559 B2 | 9/2007 | Gibson et al. |
| 7,282,151 B2 | 10/2007 | Parker et al. |
| 7,361,316 B2 | 4/2008 | Rao |
| 7,465,334 B2 | 12/2008 | Moyes et al. |
| 7,473,406 B2 | 1/2009 | Jasra et al. |
| 7,485,267 B2 | 2/2009 | Marcantonio |
| 7,541,499 B2 | 6/2009 | Kanel et al. |
| 7,648,941 B2 | 1/2010 | Soled et al. |
| 7,649,079 B2 | 1/2010 | Niitani et al. |
| 7,658,895 B2 | 2/2010 | Bhaduri |
| 7,674,369 B2 | 3/2010 | Abulnaga et al. |
| 7,686,943 B2 | 3/2010 | Soled et al. |
| 7,687,663 B2 | 3/2010 | Scaia et al. |
| 7,737,072 B2 | 6/2010 | Mironov et al. |
| 7,737,073 B2 | 6/2010 | Mironov et al. |
| 7,763,096 B2 | 7/2010 | Rizkalla et al. |
| 7,772,453 B2 | 8/2010 | Cerroni |
| 7,807,599 B2 | 10/2010 | Maesen et al. |
| 7,833,501 B2 | 11/2010 | Kobayashi et al. |
| 7,837,960 B2 | 11/2010 | Bhaduri et al. |
| 7,846,404 B2 | 12/2010 | Bhaduri et al. |
| 7,943,036 B2 | 5/2011 | Farshid et al. |
| 7,947,623 B2 | 5/2011 | Mironov et al. |
| 7,964,524 B2 | 6/2011 | Kuperman et al. |
| 8,025,793 B2 | 9/2011 | Bhattacharyya et al. |
| 8,048,292 B2 | 11/2011 | Powers et al. |
| 8,057,763 B2 | 11/2011 | Oogjen et al. |
| 8,062,508 B2 | 11/2011 | Soled et al. |
| 8,067,331 B2 | 11/2011 | Eijsbouts-Spickova et al. |
| 8,080,154 B2 | 12/2011 | Odueyungbo |
| 8,080,155 B2 | 12/2011 | Da Costa et al. |
| 2002/0112569 A1 | 8/2002 | Farone et al. |
| 2003/0178344 A1 | 9/2003 | Plantenga et al. |
| 2004/0026329 A1 | 2/2004 | Ekman et al. |
| 2004/0052708 A1 | 3/2004 | Rao |
| 2004/0163840 A1 | 8/2004 | Kanel et al. |
| 2004/0171478 A1 | 9/2004 | Crabtree et al. |
| 2004/0213715 A1 | 10/2004 | Lucien et al. |
| 2004/0237720 A1 | 12/2004 | Moyes et al. |
| 2004/0241066 A1 | 12/2004 | Jasra et al. |
| 2005/0038299 A1 | 2/2005 | Wachs et al. |
| 2005/0054869 A1 | 3/2005 | Lugmair et al. |
| 2005/0101480 A1 | 5/2005 | Ackerman et al. |
| 2005/0112740 A1 | 5/2005 | Haase |
| 2006/0106248 A1 | 5/2006 | Scaia et al. |
| 2007/0084754 A1 | 4/2007 | Soled et al. |
| 2007/0090023 A1 | 4/2007 | Soled et al. |
| 2007/0090024 A1 | 4/2007 | Soled et al. |
| 2007/0142674 A1 | 6/2007 | Kanel et al. |
| 2007/0292745 A1 | 12/2007 | Shore |
| 2008/0131343 A1 | 6/2008 | Oogjen et al. |
| 2009/0107891 A1 | 4/2009 | Kuperman et al. |
| 2009/0127165 A1 | 5/2009 | Eijsbouts-Spickova et al. |
| 2009/0133536 A1 | 5/2009 | Bhaduri |
| 2009/0136399 A1 | 5/2009 | Bhaduri |
| 2009/0136400 A1 | 5/2009 | Bhaduri |
| 2009/0139904 A1 | 6/2009 | Eijsbouts-Spickova et al. |
| 2009/0159505 A1 | 6/2009 | Da Costa et al. |
| 2009/0163350 A1 | 6/2009 | Da Costa et al. |
| 2009/0211945 A1 | 8/2009 | Eijsbouts-Spickova et al. |
| 2009/0220406 A1 | 9/2009 | Rahman |
| 2009/0226352 A1 | 9/2009 | Hsu et al. |
| 2009/0314684 A1 | 12/2009 | Kuperman et al. |
| 2010/0025297 A1 | 2/2010 | Vierheilig |
| 2010/0044277 A1 | 2/2010 | Kuperman et al. |
| 2010/0163459 A1 | 7/2010 | Odueyungbo |
| 2010/0163499 A1 | 7/2010 | Odueyungbo |
| 2010/0167910 A1 | 7/2010 | Odueyungbo |
| 2010/0167912 A1 | 7/2010 | Odueyungbo |
| 2010/0199807 A1 | 8/2010 | Stiksma et al. |
| 2010/0234212 A1 | 9/2010 | Brait et al. |
| 2010/0248945 A1 | 9/2010 | Eijsbouts-Spickova et al. |
| 2010/0256433 A1 | 10/2010 | Knottenbelt et al. |
| 2011/0100832 A1 | 5/2011 | Lubomirsky et al. |
| 2011/0124493 A1 | 5/2011 | Kuperman et al. |
| 2011/0124494 A1 | 5/2011 | Mironov et al. |
| 2011/0124496 A1 | 5/2011 | Mironov et al. |
| 2011/0124498 A1 | 5/2011 | Kuperman et al. |
| 2011/0155636 A1 | 6/2011 | Hanks et al. |
| 2011/0163009 A1 | 7/2011 | Novak et al. |
| 2011/0308997 A1 | 12/2011 | Bhattacharyya et al. |

OTHER PUBLICATIONS

U.S. Appl. No. 13/275,628, filed Oct. 18, 2012, Kuperman, et al.
U.S. Appl. No. 13/275,557, filed Oct. 18, 2012, Kuperman, et al.
U.S. Appl. No. 13/275,597, filed Oct. 18, 2012, Kuperman, et al.
Pierluigi Barbaro et al., Exchange Resins: Catalyst Recovery and Recycle, Chem. Rev., 2009, 109(2), pp. 515-529.
K. Shams et al., Platinum recovery from a spent industrial dehydrogenation catalyst using cyanide leaching followed by ion exchange, Applied Catalysis A: General, vol. 258, Issue 2, Feb. 20, 2004, pp. 227-234.
K. Shams et al., Improved and selective platinum recovery, Journal of Hazardous Materials, vol. 131, Issues 1-3, Apr. 17, 2006, pp. 229-237.

HYDROCONVERSION MULTI-METALLIC CATALYST AND METHOD FOR MAKING THEREOF

CROSS-REFERENCE TO RELATED APPLICATIONS

This application claims priority to U.S. Patent Application Ser. No. 61/412,763 with a filing date of Nov. 11, 2010. This application claims priority to and benefits from the foregoing, the disclosures of which are incorporated herein by reference.

TECHNICAL FIELD

The petroleum industry increasingly turns to heavy crudes, resids, coals and tar sands, i.e., lower grade hydrocarbon, as sources for feedstocks. The upgrading or refining of these feedstocks is accomplished by treating the feedstocks with hydrogen in the presence of catalysts to effect conversion of at least a portion of the feeds to lower molecular weight hydrocarbons, or to effect the removal of unwanted compounds, or their conversion to less undesirable compounds Hydroconversion catalysts can be supported or self-supported (unsupported). Supported catalysts usually comprise of at least one Group VIB metal with one or more Group VIII metals as promoters on a refractory support such as alumina. Unsupported (or "bulk") mixed Group VIII and Group VIB metal catalysts and catalyst precursors used for hydroconversion processes are known in the art as disclosed in U.S. Pat. Nos. 2,238,851; 5,841,013; 6,156,695; 6,566,296 and 6,860,987.

In the process of making and using hydrotreating catalysts, a substantial amount of metal residues and wastes are generated in the form of raw and intermediate materials, e.g., in the supernatant generated in the recovery of the catalyst precursor precipitate and discharged in an effluent stream. In some processes for making hydroconversion catalysts, up to 60% of the metal feed such as Ni, Mo, W, etc., may be wasted and discharged in the effluent stream, putting pressure on the downstream waste treatment process. As the environmental impact of waste disposal such as metal-containing waste materials gets more scrutinized, there is a need for improved processes to make hydroconversion catalysts with minimal waste. There is also a need for effective recovery of residual precious metals from reaction effluents for re-use in the process of making hydrotreating catalysts.

SUMMARY

In one aspect, the invention relates to an improved method for forming a bulk hydroprocessing catalyst with minimal metals in the effluent to waste treatment, the method comprising: co-precipitating at reaction conditions at least one of a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing at least a Promoter metal residual and at least a Group VIB metal residual in an amount of at least 10 mole % of the metal precursor feeds; treating the supernatant by any of chemical precipitation, ion exchange, electro-coagulation, and combinations thereof to generate first effluent stream containing less than 50 mole % of at least one of the metal residuals; recovering at least 80 mole % of the metal ions in at least one of the metal residuals to form a metal precursor feed; sulfiding the catalyst precursor forming the bulk catalyst; and recycling the metal precursor feed to the co-precipitating step.

In one aspect, the invention relates to a process for forming a bulk hydroprocessing catalyst, the method comprises co-precipitating at reaction conditions at least one of a Group VIB metal precursor feed and at least a Promoter metal precursor feed selected from Group VIII, Group IIB, Group IIA, Group IVA and combinations thereof, to form a mixture comprising a first catalyst precursor and a first supernatant containing a Promoter metal residual and a Group VIB metal residual in an amount of at least 10 mole % of the metal precursor feeds; adding at least a precipitant to the mixture at a molar ratio of added precipitant to metal residuals ranging from 1.5:1 to 20:1 to precipitate at least 50 mole % of metal ions in at least one of the metal residuals, forming a second catalyst precursor; isolating the first and second catalyst precursors forming a second supernatant containing less than 2000 ppm of metal ions; and sulfiding the first and second catalyst precursors forming the bulk catalyst.

In another aspect for an improved method to form a bulk hydroprocessing catalyst composition, the method comprises: co-precipitating at reaction conditions at least one of a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing a Promoter metal residual and a Group VIB metal residual in an amount of at least 10 mole % of the metal precursor feeds; providing at least an exchange resin; contacting the supernatant with the ion exchange resin for a sufficient amount of time for at least 50 mole % of metal ions in at least one of the metal residuals in the supernatant to be exchanged and bound onto the resin, forming a first effluent stream containing unbound metal residuals; eluting the resin to produce an eluate containing the previously bound metals; recovering at least 80 mole % of metal ions in the unbound metal residuals in the first effluent stream or at least 80 mole % of previously bound metal ions in the eluate to form at least a metal precursor feed for use in the co-precipitating step; and sulfiding the catalyst precursor forming the bulk catalyst.

In another aspect for an improved method to form a bulk hydroprocessing catalyst composition, the method comprising: co-precipitating at reaction conditions at least one of a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing a Promoter metal residual and a Group VIB metal residual in an amount of at least 10 mole % of the metal precursor feeds; supplying the supernatant to a vessel having a plurality of electrodes having a positive or a negative charge provided by a power supply; reacting the electrodes with at least one of the metal precursors, forming a slurry containing insoluble metal compounds; recovering the insoluble metal compounds, forming a first effluent stream containing less than 20 mole % of at least one of the metal residuals; recovering at least 80 mole % of at least one of the metal residuals from the first effluent stream to form at least a metal precursor feed for use in the co-precipitating step, forming a second effluent stream contains less than 1000 ppm of one of the metal precursors; sulfiding the catalyst precursor forming the bulk catalyst; and recycling the metal precursor feed to the co-precipitating step.

In another aspect, the invention relates to an improved method to form a bulk hydroprocessing catalyst composition, comprising co-precipitating at reaction conditions at least one of a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing at least a Promoter metal residual and at least a Group VIB metal residual in an amount of at least 10 mole % of the metal precursor feeds; mixing the supernatant with at least one of an acid, a sulfide-containing compound, a base, and combinations thereof under mixing conditions at a temperature from ambient to 90° C. for a sufficient amount of time to precipitate at least 50% of at least one of the metal residuals, wherein the precipitation is carried out at a pre-select pH; isolating the precipitate to recover a first effluent containing less than 50 mole % of at least one of the metal residuals in the supernatant; converting the precipitate into at least a metal precursor feed; recycling the at least a metal precursor feed to the co-precipitating step; and sulfiding the catalyst precursor forming the bulk catalyst.

In another aspect, the invention relates to yet another method to form a bulk hydroprocessing catalyst composition, comprising: co-precipitating at reaction conditions at least a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing at least a Promoter metal residual and at least a Group VIB metal residual in an amount of at least 10 mole % of the metal precursor feeds; mixing the supernatant with at least at least an acid, a sulfide-containing compound, a base under mixing conditions at a temperature from ambient to 90° C. to adjust its pH; contacting the supernatant with a chelated ion exchange resin for a sufficient amount of time for at least 50 mole % of metal ions in at least one of the metal residuals in the supernatant to be exchanged and bound onto the resin, forming a first effluent containing less than 1000 ppm of at least one of the metal residuals; eluting the resin to produce an eluate containing the previously resin-bound metals; recovering at least 80 mole % of the unbound metal residuals in the first effluent stream or at least 80 mole % of the previously resin-bound metals in the eluate to form at least a metal precursor feed; recycling the metal precursor feed to the co-precipitating step; and sulfiding the catalyst precursor forming the bulk catalyst. In one embodiment with a weak acid resin, the resin functions as an anion exchange resin with an acidic supernatant for the recovery of Group VIB metal residuals, and a cation exchange resin with a basic supernatant for the recovery of Promoter metal residuals.

In yet another aspect, the invention relates to a method for forming a hydroprocessing catalyst composition. The method comprises: co-precipitating at reaction conditions at least a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing at least a Promoter metal residual and at least a Group VIB metal residual in an amount of at least 10 mole % of the metal precursor feeds; mixing the supernatant with at least one of an acid, a sulfide-containing compound, and combinations thereof for a sufficient amount of time to precipitate at least a portion of metal ions in at least one of the metal residuals, wherein the precipitation is carried out at a first pre-select pH; isolating the precipitate to recover a first effluent containing less than 50 mole % of metal ions in at least one of the metal residuals in the supernatant; contacting the first effluent with a first chelated ion exchange resin at a second pre-select pH for a sufficient amount of time for at least 50 mole % of metal ions in at least one of the metal residuals in the first effluent to be bound onto the resin, forming a second effluent containing less than 1000 ppm of metal ions in at least one of the metal residuals; and contacting the second effluent with a second chelated ion exchange resin at a third pre-select pH for a sufficient amount of time for at least 50 mole % of metal ions in at least one of the metal residuals in the first effluent to be bound onto the resin, forming a third effluent containing less than 100 ppm of metal ions in at least one of the metal residuals.

DETAILED DESCRIPTION

Figure 1:
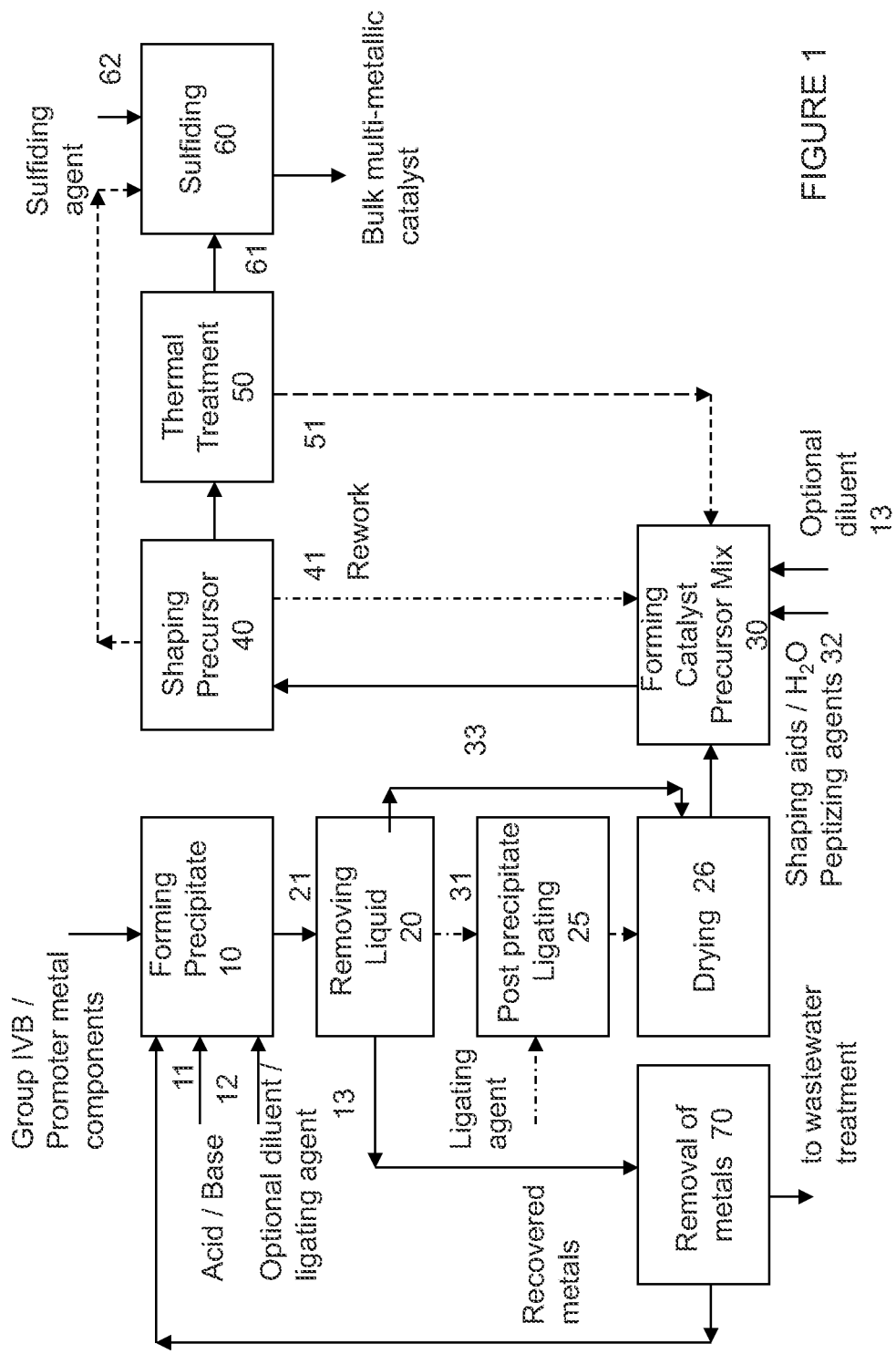
FIG. 1 provides an overview of an embodiment of a process for making a bulk multi-metallic catalyst with minimal loss of metal waste, including steps to recover the metal components.

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

The Periodic Table referred to herein is the Table approved by IUPAC and the U.S. National Bureau of Standards, an example is the Periodic Table of the Elements by Los Alamos National Laboratory's Chemistry Division of October 2001.

"Bulk catalyst" may be used interchangeably with "unsupported catalyst," or "self-supported catalyst," meaning that the catalyst composition is NOT of the conventional catalyst form which has a preformed, shaped catalyst support which is then loaded with metal compounds via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder.

"Precipitant" refers to an additive or compound, which can be in any form, e.g., liquid or solid form, employed to selectively extract desired metal or metals from a composition.

"Gel" or "cogel" refers to a solid, gelatinous material that is formed in the precipitation, co-precipitation, or cogelation reaction between at least two metal precursor feeds.

"Co-precipitate" or co-precipitating refers to the reaction between at least two metal precursor feeds to form a catalyst precursor in the form of a gel or cogel.

"Metal precursor feed" means a reactant feed to the co-precipitation reaction to form a catalyst precursor, which reactant feed can be a solid, a liquid, or partially solid, and which reactant feed can be either mono-metallic or multi-metallic.

"Metal residual" in either plural or singular form, referring to residual metal compound(s) left in solution from the co-precipitation reaction of the metal precursor feed.

"Supernatant" (or "supernatant stream") refers to the remainder liquid after the isolation of the catalyst precursor, which liquid contains metal residuals, e.g., the residual metal compound(s) left in solution from the reaction to form catalyst precursors. In one embodiment, the supernatant contains metal residuals in an amount of up to 60 mole percent (mole %) of the metal ions of the metal precursor feed.

"Secondary catalyst precursor" (or "additional catalyst precursor") refers to the additional catalyst precursor formed with residual metal compounds (e.g., metal residuals) in the supernatant.

"Bound metal ions" refers to metals ions that are exchanged and bound onto ion-exchange resin.

"Unbound metal residuals" refers to the metal residuals that do not react and are not bound onto the ion-exchange resin.

"Effluent" (or "effluent stream") refers to the waste water stream discharged from a metal recovery step. In one embodiment, the effluent is sent to waste water treatment.

"Treating" in the context of treating an effluent stream or an eluate refers to a step wherein the stream is processed in a way that precipitate is formed, e.g., via chemical precipitation, electro-coagulation, evaporation, etc., or combinations thereof. The treating step may comprise an isolation step to recover a precipitate and a solution.

"ppm" of a metal in the supernatant or effluent stream refers to parts per million of the metal ions in the stream.

% of a metal (expressed as concentration of the metal in a composition or a stream) refers to its mole %, unless indicated otherwise.

"One or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

"Hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

700° F.+ conversion rate refers to the conversion of a feedstock having a boiling point of greater than 700° F.+ to less than 700° F. (371° C.) boiling point materials in a hydroconversion process, computed as (100%*(wt. % boiling above 700° F. materials in feed−wt. % boiling above 700° F. materials in products)/wt. % boiling above 700° F. materials in feed)).

"Shaped catalyst precursor" means a catalyst precursor formed (or shaped) by spray drying, pelleting, pilling, granulating, beading, tablet pressing, bricketting, using compression method via extrusion, or other means known in the art, or by the agglomeration of wet mixtures. The shaped catalyst precursor can be in any form or shape, including but not limited to pellets, cylinders, straight or rifled (twisted) tri-lobes, multiholed cylinders, tablets, rings, cubes, honeycombs, stars, tri-lobes, quadra-lobes, pills, granules, etc.

"Promoter Metal" (or "promoter metal") may be used interchangeably with $M^P$, referring to a material that enhances the activity of a catalyst (as compared to a catalyst without the Promoter Metal, e.g., a catalyst with just a Group VIB metal).

In the sections that follow, the reference to "molybdenum" and/or "tungsten" is by way of exemplification only for the Group VIB metal to be recovered in the supernatant, and is not intended to exclude other Group VIB metals/compounds and mixtures of Group VIB metal/compounds for recovery. Similarly, the reference to "nickel" is by way of exemplification only for the Promoter metal component(s) for recovery, and is not meant to exclude other Group VIII, Group IIB, Group IIA, Group IVA metals and combinations thereof that can be in the supernatant for subsequent recovery.

The catalyst precursor can be a hydroxide or oxide material, prepared from at least a Promoter metal precursor feed and at least a Group VIB metal precursor feed. The bulk or unsupported catalyst precursor made can be converted into a hydroconversion bulk catalyst (becoming catalytically active) upon sulfidation. The bulk catalyst is for use in hydrodesulfurization (HDS), hydrodearomatization (HDA), and hydrodenitrification (HDN) processes. Further details regarding the description of the catalyst precursor and the bulk catalyst formed thereof are described in a number of patent applications and patents, including U.S. Pat. No. 7,544,285, U.S. Pat. No. 7,615,196, U.S. Pat. No. 6,635,599, U.S. Pat. No. 6,635,599, U.S. Pat. No. 6,652,738, U.S. Pat. No. 7,229,548, U.S. Pat. No. 7,288,182, U.S. Pat. No. 6,566,296, U.S. Pat. No. 6,860,987, U.S. Pat. No. 6,156,695, U.S. Pat. No. 6,162,350, U.S. Pat. No. 6,299,760, U.S. Pat. No. 6,620,313, U.S. Pat. No. 6,758,963, U.S. Pat. No. 6,783,663, U.S. Pat. No. 7,232,515, U.S. Pat. No. 7,179,366, U.S. Pat. No. 6,274,530; US Patent Publication Nos. US20090112011A1, US20090112010A1, US20090111686A1, US20090111685A1, US20090111683A1, US20090111682A1, US20090107889A1, US20090107886A1, US20090107883A1, US2007090024; U.S. patent application Ser. No. 12/432,719, U.S. patent application Ser. No. 12/432,721, U.S. patent application Ser. No. 12/432,723, U.S. patent application Ser. No. 12/432,727, U.S. patent application Ser. No. 12/432,728, and U.S. patent application Ser. No. 12/432,728, the relevant disclosures with respect to the catalyst precursor and catalyst composition are included herein by reference.

In one embodiment, the catalyst precursor is a bulk multi-metallic oxide, comprising of at least one Group VIII non-noble material and at least two Group VIB metals. In one embodiment, the ratio of Group VIB metal to Group VIII non-noble metal in the precursor ranges from about 10:1 to about 1:10. In another embodiment, the oxide catalyst precursor is of the general formula: $(X)_b(Mo)_c(W)_dO_z$; wherein X is Ni or Co, the molar ratio of b:(c+d) is 0.5/1 to 3/1, the molar ratio of c:d is >0.01/1, and z=[2b+6(c+d)]/2. In yet another embodiment, the oxide catalyst precursor further comprises one or more ligating agents L. The term "ligand" may be used interchangeably with "ligating agent," "chelating agent" or "complexing agent" (or chelator, or chelant), referring to an additive that combines with metal ions, e.g., Group VIB and/or Promoter metals, forming a larger complex, e.g., a catalyst precursor.

In another embodiment, the catalyst precursor is in the form of a hydroxide compound, comprising of at least one Group VIII non-noble material and at least two Group VIB metals. In one embodiment, the hydroxide catalyst precursor is of the general formula $A_v[(M^P)(OH)_x(L)^n_y]_z(M^{VIB}O_4)$, wherein A is one or more monovalent cationic species, M refers to at least a metal in their elemental or compound form, and L refers to one or more ligating agent. In one embodiment, A is at least one of an alkali metal cation, an ammonium, an organic ammonium and a phosphonium cation. In one embodiment, A is selected from monovalent cations such as NH4+, other quaternary ammonium ions, organic phosphonium cations, alkali metal cations, and combinations thereof.

In one embodiment, the optional ligating agent L has a neutral or negative charge $n<=0$. The term "charge-neutral" refers to the fact that the catalyst precursor carries no net positive or negative charge. Examples of ligating agents L include but are not limited to carboxylates, carboxylic acids, aldehydes, ketones, the enolate forms of aldehydes, the enolate forms of ketones, and hemiacetals; organic acid addition salts such as formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids; carboxylate containing compounds such as maleate, formate, acetate, propionate, butyrate, pentanoate, hexanoate, dicarboxylate, and combinations thereof.

In one embodiment, $M^{VIB}$ is at least a Group VIB metal having an oxidation state of +6. In another embodiment, $M^{VIB}$ is a mixture of at least two Group VIB metals, e.g., molybdenum and chromium. $M^{VIB}$ can be in solution or in partly in the solid state In one embodiment, $M^P$ is at least a promoter metal. In one embodiment, $M^P$ has an oxidation state of either +2 or +4. $M^P$ is selected from Group VIII, Group IIB, Group IIA, Group IVA and combinations thereof. In one embodiment, $M^P$ is at least a Group VIII metal with $M^P$ having an oxidation state P of +2. In another embodiment, $M^P$ is selected from Group IIB, Group IVA and combinations thereof. In one embodiment, $M^P$ is selected from the group of IIB and VIA metals such as zinc, cadmium, mercury, germanium, tin or lead, and combinations thereof, in their elemental, compound, or ionic form. In another embodiment, $M^P$ is a Group IIA metal compound, selected from the group of magnesium, calcium, strontium and barium compounds. $M^P$ can be in solution or in partly in the solid state, e.g., a water-insoluble compound such as a carbonate, hydroxide, fumarate, phosphate, phosphite, sulphide, molybdate, tungstate, oxide, or mixtures thereof.

Embodiments of the process for making the unsupported or bulk catalyst precursor are as described in the references indicated above, and incorporated herein by reference. In one embodiment, the first step is a mixing step wherein at least one Group IVB metal precursor feed and at least one Promoter metal precursor feed are combined together in a precipitation step (also called cogelation or co-precipitation), wherein a catalyst precursor is formed as a gel. The precipitation (or "cogelation") is carried out at a temperature and pH under which the promoter metal compound and the Group VIB metal compound precipitate (e.g., forming a gel). In one embodiment, the temperature is between 25-350° C. and at a pressure between 0 to 3000 psig. The pH of the reaction mixture can be changed to increase or decrease the rate of precipitation (cogelation), depending on the desired characteristics of the catalyst precursor product. In one embodiment, the mixture is left at its natural pH during the reaction step(s). In another embodiment, the pH is maintained in the range of 0-12.

In one embodiment, at least one chelating (ligating) agent and/or other materials including but not limited to diluents (or binders) can be added to the precipitation step in the formation of the catalyst precursor. The additive can be added concurrently with the metal precursor feedstock, or after the formation of the catalyst precursor gel.

After the co-precipitation step, the catalyst precursor is isolated or recovered in a liquid removal step using known separation processes such as filtering, decanting, centrifuging, etc. The remainder liquid, i.e., the supernatant, in one embodiment contains metal residuals in an amount of at least 10 mole % and up to 60 mole % of the metal ions in the metal precursor feeds, as elemental metals or metal compounds, referring generally as "metals." In another embodiment, the supernatant contains metal residuals in an amount from 15 to 40 mole % of the metal ions in the metal precursor feeds. In one embodiment for making a Ni—Mo—W catalyst, the supernatant contains from 5000 to 10000 ppm Mo, 1000 to 5000 W, and 500 to 3000 ppm Ni.

After the isolation of the catalyst precursor, metals in the supernatant in one embodiment can be recovered using any of chemical precipitation, electro-coagulation, ion-exchange, evaporation, membrane filtration, and combinations thereof. In another embodiment, the metal recovery step can also carried out with the addition of at least a precipitant to form a secondary catalyst precursor. The metal recovery can be done in batch mode, continuous mode, or combinations thereof.

Description of the various metal recovery process steps for recycling/incorporation into the catalyst precursor follows. Any of the steps can be employed by itself or in combination with other steps, reducing metals in the effluent stream to waste treatment to less than 5000 ppm in one embodiment, less than 1000 ppm in a second embodiment, less than 500 ppm in a third embodiment, and less than 50 ppm in a fourth embodiment.

Chemical Precipitation:

In one embodiment, the supernatant is treated to adjust the pH at a level at which selective precipitation of at least a portion of the metal ions in at least one of the metal residuals occurs ("pre-selected pH"). In one embodiment, at least a portion means at least 25 mole %, and at least 50% in a second embodiment. Up to 99% of metal ions in at least one of the metal residuals can be recovered in subsequent precipitation steps to precipitate any metal compounds remaining in solution. The optimal pH for precipitation depends on the metal(s) to be recovered and the counter ion used in the precipitating agent (e.g., hydroxide, carbonate, sulfide, etc.). In one example with the supernatant containing both Ni and Cr metal residuals, the pH may be pre-selected to precipitate both metals.

In one embodiment, at least an acid is employed to adjust the pH of the supernatant to the pre-select pH. The acid used to precipitate the supernatant may include any acid with a relatively high ionization constant. In one embodiment, the acid is used in a strength ranging from 1.0 to 12.0 normal. In one embodiment, the acid is selected from the group of sulfuric acid, hydrochloric acid, phosphoric acid, nitric acid, acetic acid, oxalic acid, nitric acid, and mixtures thereof.

In one embodiment, the supernatant is treated with at least a precipitating agent to extract out at least one of metals as a precipitate. The selection of the precipitating agent(s) depends on a number of factors, including but not limited to the metal(s) to be recovered as a precipitate. The agents can be added all at once or in sequence. The chemical precipitation can be carried out in batch or continuous mode.

In one embodiment with a Group VIB metal such as molybdenum, chromium, etc., as one of the metals to be recovered, the precipitating agent is selected from the group of calcium hydroxide, sodium hydroxide and magnesium oxide, with MgO is preferred. In another embodiment, the precipitating agent is a mixture of sodium carbonate and hydrogen peroxide.

In one embodiment, the pH of the supernatant is adjusted such that at least 95% of the Group VIB metals precipitate. In another embodiment, the pre-selected pH is set at less than 3.5 to precipitate at least 90% of the soluble molybdenum metal compounds. In another embodiment with tungsten as a co-catalyst, the pre-selected pH is from 1 to 2 to initiate precipitation of at least 95% of soluble metal compounds. In yet another embodiment, nitric acid is added to the supernatant for a pH of 1 to 2 to precipitate out Mo and W as $H_2MoO_4$ and $H_2WO_4$ respectively, removing at least 75% of the unreacted Group VIB precursors from solution. Generally, several metals can form a precipitate at a given pH. For example, at a pH level of less than 3, both Mo and Ni (and Co, if any) precipitate although more molybdenum precipitates relative to nickel. Additionally, the precipitating concept described herein can be repeated at another pre-selected pH or pH range to precipitate other metals.

In one embodiment, the precipitating agent is a sulfide-containing compound, e.g., a water soluble sulfide, a water soluble polysulfide, or mixtures thereof, employed to adjust the pH of the supernatant to a level at which precipitation of metals occurs. In one embodiment, hydrogen sulfide, a combination of hydrogen sulfide and caustic soda, ammonium sulfide, NaHS, or $Na_2S$, or mixtures thereof can be used in an amount of about 0.05 to 0.2 molar to precipitate out molybdenum, tungsten, and the like.

Depending on the metal residuals present in the supernatant and the precipitation agent used, in one embodiment, chemical precipitation is carried out in one single step. In another embodiment, chemical precipitation is carried out as a multi-step process. The multi-process can be a combination of basic and acid precipitation steps, with either the basic precipitation or acid precipitation step to be the first step.

In one embodiment of the acid precipitation step, an acid is added to the supernatant to adjust the pH and precipitate out most of the metals as metal compounds such as molybdate, tungstate, etc., in a slurry mixture. The metal precipitates are isolated from the slurry using separation means known in the art, resulting in a filtrate stream containing less than 25% of the metal ions in the metal residuals originally in the supernatant. In the basic precipitation step, an alkaline earth metal compound, e.g., alkaline halides, particularly calcium halide, can be added to the filtrate to further extract out metals. The precipitate is recovered in a separator to separate out metals such as $CaMoW_4$, $CaWO_4$, and the like to waste disposal. The effluent containing less than 100 ppm metals can be sent to the sewer.

In one embodiment, the chemical precipitation (acid or basic) of the metal complexes is carried out under mixing conditions at a temperature in the range of 50 to 95° C., and for a sufficient amount of time, e.g., for at least 1 hour, for at least 75% of the Group VIB and group VIII metals to precipitate out. In one embodiment, the precipitation is carried out at a temperature of 70° C. and a pH level between 1.2 to 2.5. In another embodiment, the pH is adjusted to a level between 1 to 4. In one embodiment, the pH is continuously regulated for at least part of the precipitation step with continuous addition of additives, e.g., an acid, calcium oxide, potassium hydroxide solution, sulfide-containing compound, etc., to control the precipitation rate as well as the type of metal complexes to precipitate. In one embodiment, a sufficient amount of sulfuric acid (20-100% by weight) is used to adjust the pH to the desired target level, with the mixture being maintained at a temperature of 60-90° C. for 1 to 3 hours, until at least 75% of the Group VIB metals precipitate out. pH controllers known in the art can be used to automatically measure and control the pH, maximizing the amount of metals precipitated. A voltametric sensor can be used to control the pH.

After precipitation, the solid precipitate containing metal complexes can be separated or isolated from the effluent by known means including but not limited to settling, filtration, decantation, centrifugation, magnetic separation, dissolved air flotation, vortex separation, inclined plate separation, etc., or combinations thereof. In one embodiment, the solid precipitate comprises primarily of Group VIB metal complexes, e.g., molybdate, chromate, tungstate, and the like. In one embodiment, a basic solution, e.g., ammonium chloride, ammonium citrate, ammonium lactate, potassium hydroxide, potassium formate, sodium hydroxide, sodium acetate, or ammonium hydroxide solution is added to dissolve the precipitate, producing a saturated solution having a pH of about 5 to about 7. The solution may be cooled from its saturation temperature to room temperature wherein ammonium polymolybdate (e.g., ammonium heptamolybdate or AHM) and ammonium polytungstate (e.g., ammonium heptatungstate or AHT) precipitate out. The solution can be routed or recycled to the co-precipitation reaction as metal precursor feed.

In one embodiment for a process to make a multi-metallic catalyst containing a Group VIB metal such as molybdenum or chromium, the supernatant may be reduced with carbon monoxide or low molecular weight oxygenated hydrocarbons in a redox reaction. The reduction results in the precipitation of a Group VIB oxide product, e.g., a hydrated chromium oxide, and a spent liquor containing alkali metal salts of carbonate or bicarbonate, which is dehydrated to yield alkali metal salts and wastewater effluent containing less than 50 ppm Group VIB metals to sewer.

Electro-Coagulation:

In one embodiment, electro-coagulation running in either batch or continuous mode, is employed to recover metals from the supernatant using sacrificial electrodes. The electrodes may be fabricated from materials which may sacrifice or donate ions in an electrolytic process, e.g., iron, titanium, platinum, steel, aluminum, copper carbon, metal-impregnated plastics, ceramics or the like. In one embodiment, iron is used in the cathodes. In another embodiment, aluminum is used in the cathodes, forming insoluble complexes with various Promoter metal residuals in the supernatant, for a removal of Promoter metals such as Ni, Zn, Co, etc. of at least 75 mole % in one embodiment and 90 mole % in a second embodiment. In one embodiment, three dimensional electrodes are used for increased effective area instead of two-dimensional plates as electrodes. In another embodiment, the electrodes comprise substantially parallel metallic electrolytic plates.

In the reactor vessel, supernatant meanders through the electrodes and is under the influence of the electromotive force from the electrical current supplied to the electrodes. In one embodiment, power is a voltage source that supplies at least 150 amperes at a minimum of 15 volts. Power supply can be either direct current or alternating current. The removal of metals from the supernatant as metal complexes can be optimized by varying a number of factors, e.g., the amperage, voltage, current density, flow rate of the supernatant, the pH of the supernatant, run time, etc. In one embodiment, the electro-coagulation process is carried out for 15 minutes to 5 hours. In a second embodiment, for ½ to 3 hours. In a third embodiment, 60 to 90 minutes. In another embodiment, the electro-coagulation is carried out in conjunction with ultrasound and agitation to aid with the metal removal.

Depending on the selection of the electrodes, at least 75% of at least one of the metal ions in the metal residuals, e.g., Promoter metal residuals or the Group VIB metal residuals, are removed as metal complexes. In one embodiment, at least 90% of metal ions in the Promoter metal residuals are removed as insoluble compounds, with essentially all of (e.g., at least 95%) the metal ions in the Group VIB metal residuals still remaining in solution. In another embodiment, at least 90% of the metal ions in the Group VIB metal residuals are removed from the supernatant as precipitates with essentially all of the Promoter metal residuals still remaining in solution.

In one embodiment with the use of aluminum is used as electrodes, Promoter metals in the supernatant, e.g., group VIII compounds, come into contact and react via oxidation/reduction with the dissolved metallic ions subsequently form a slurry containing in-soluble by-products such as $NiAlO_4$. The pH of the slurry ranges from 6 to 10 in one embodiment, and 4 to 7 in a second embodiment. The insoluble by products can be isolated and recovered by known means including settling, filtration, decantation, centrifugation, etc., or combinations thereof, yielding an effluent stream substantially free of insoluble by-products, e.g., less than 50 ppm of Promoter metals such as Ni. After recovery, the insoluble by-products containing recovered metals, e.g., $NiAlO_4$, can be sent to waste disposal.

In one embodiment, prior to the electro-coagulation vessel, chemical precipitation method is employed with the pH of the supernatant being controlled or adjusted to a certain pre-selected level with the addition of basic or acid chemical agents. In one embodiment, the pH of the supernatant is adjusted to between 5-9. In another embodiment, the pH is adjusted to about 7. In yet another embodiment, an oxidizing agent is added to the supernatant prior to the reaction in the electro-coagulation vessel, with the oxidizing agent selected from the group of oxygen, chlorine, permanganate, hydrogen peroxide and ozone. The oxidizing agent helps enhance oxidation/reduction reaction to precipitate out the metals.

In one embodiment, the effluent stream from the electro-coagulation step can be further treated by a chemical precipitation step with the addition of a sufficient amount of an acid and the like, in an acid precipitator, under mixing conditions to adjust the pH to a pre-selected pH, e.g., 3 or less, precipitating out Group VIB metals as molybdate, tungstate, and the like. In one embodiment, the precipitate is re-dissolved in an aqueous ammonium hydroxide solution, which is filtered and subsequently crystallized to produce a high purity ammonium molybdate/ammonium tungstate product. These products can be subsequently recovered and use as metal precursor feeds. The effluent from this chemical precipitation step in one embodiment contains less than 2000 ppm Mo, less than 500 ppm W, and minimal amounts of Promoter metal residuals, e.g., less than 50 ppm Ni.

In yet another embodiment, the effluent stream from the chemical precipitation step is further treated with a calcium compound, e.g., $CaSO_4$, $CaCO_3$, etc., for the recovery of any residual Group VIB metals as calcium salts for waste disposal, and for an effluent stream from the process with less than 10 ppm of either Group VIB metals or Promoter metals. In one embodiment, the amount of calcium added is at least stoichiometric to convert the Group VIB values to $CaMoO_4$, $CaWO_4$, and the like. In another embodiment, the ratio ranges from 2/1 to 50/1. In one embodiment, the calcium treatment is at a temperature ranging from 75° C. up to the boiling point of the solution employed, for 5 minutes to several hours.

Depending on the metal residuals in the stream to be treated and the electrodes used, the effluent stream from the electro-coagulation step in one embodiment contains less than 1000 ppm metals. In a second embodiment, less than 500 ppm metals. In a third embodiment, less than 100 ppm metals. In a fifth embodiment, less than 50 ppm metals.

Ion-Exchange:

The recovery of metals from the supernatant can also be carried out via ion-exchange. The metal recovery rate depends on a number of factors, including but not limited to the types of resins used in the ion-exchange bed, the concentration of the metals in the supernatant, the pH of the supernatant, as well as the flow velocity of the supernatant through the ion-exchange resin.

Depending on the metals to be recovered/removed from the supernatant, either anion exchange and/or cation exchange technology may be employed to exchange ions such as hydrogen and hydroxyl ions on the resin for at least 50% of the metal ions from at least one of the metal residuals in the supernatant. The metal ions are "exchanged" and bound onto the resin. In another embodiment, at least 80% of the metal ions of at least one of the metal residuals are exchanged with ions in the resin and bound onto the resin. The unbound metal residuals remain in the effluent stream for subsequent metal recovery and/or water treatment if desired.

In one embodiment, both anion and cation exchange columns are used for the recovery. In one embodiment, the anion and cation exchange columns employ the same type of ion-exchange resin, with the pH of the supernatant in each column being adjusted to control the metal scavenging affinity of the resin, and for the column to function as an anion or a cation exchange column.

Depending on the metals to be recovered from the supernatant and the resins to be used, the ion-exchange can be carried out at a temperature ranging from ambient to 90° C. in one embodiment, and 50 to 80° C. in another embodiment. The contact time varies depending on a number of factors, in one embodiment ranges from 1 to 60 bed volumes per hour. In another embodiment, from 2 to 20 bed volumes per hour. In a third embodiment, from 3 to 10 bed volumes per hour.

In one embodiment, a short bed column is used for the metal recovery. In another embodiment, either a single column or a series of columns or bed can be employed. The metals accumulate to a high level on the first bed and the second bed is used to remove the residual metals to the desired target. Either single pass or dual pass ion-exchange system may be employed. The columns may be operated in batch, continuous, or semi-batch mode. In one embodiment, metal recovery is operated continuously with an inlet for the supernatant stream and an outlet for discharging the treated stream. In one some embodiments after a run, the resins may be regenerated by rinsing with a suitable acid, or an aqueous solution of suitable hydroxide. In one embodiment, the supernatant is first heated to a temperature between 50-80° C. degree to improve the kinetics to the exchange process.

The ion-exchange media comprises an ion exchange resin or a mixture of ion exchange resins. Suitable ion exchange resins may be selected from the group consisting of strong base anion exchange resins, weak base anion exchange resins, strong acid cation exchange resins, weak acid cation exchange resins, chelating resins, and mixtures thereof. In one embodiment, the ion exchange resins have an average particle size of from 150-2000 μm. In another embodiment, the ion exchange resin has an average particle size of from 300-1200 μm. The average particle size of the ion exchange resin may be measured by various analytical methods generally known in the art including, for example, ASTM E-11-61.

In one embodiment, cation resins are employed to exchange hydrogen ions for positively charged ions such as Promoter metals, e.g., copper, nickel, etc. In another embodiment, anion resins may be employed to exchange hydroxyl ions for negatively charged ions such the Group VIB metals, e.g., chromates, molybdate, tungstate, etc. In yet another embodiment, anion technology employing cation ion chelated resins to remove anions such as Group VIB metals from the supernatant. In one embodiment of anion exchange, the resin is of the weakly basic type. In one embodiment, the anion exchange resins comprise an intermediate amine as the exchange site. In another embodiment, the resin used is a mixture of secondary and tertiary amines. In a third embodiment, the resin is a polystyrene divinyl benzene. Other examples of anion exchange resins include but are not limited to tertiaryamine in styrene divinyl benzene matrices, tertiary amine type resins, epichlorhydrine-polyamine condensation-type (aliphatic polyamine types) type resins as well as equivalent types, which are effective to selectively adsorb the molybdate anions/tungstate anions in a substantially neutral medium. In one embodiment, the resin is a polyampholite (chelating ion-exchange). Chelating polymeric resin comprises copolymers with covalently-linked functional groups, containing one or more donor atoms (Lewis Base), for forming coordinated bindings with most metal ions. In one embodiment, a chelating exchange resin with amine functionality is employed. In another embodiment, a chelating exchange resin with selectivity for transition metal cations over alkali or alkaline earth cations is employed. In yet another embodiment, the chelating exchange resin has at least one substituent selected from hydroxy, ether, amine, quaternary amine, a divalent sulfur substituent, amine oxide and hydroxy amine. Examples of commercially available chelating exchange resins include but are not limited to DOWEX™ G-26 resin, DOWEX™ MAC-3 resin, DOWEX™ M4195 resin, Amberlite™ IRC86 resin, and Amberlite™ IRC748 resin.

In one embodiment with the use of a weak acid chelating resin, the resin acts as an anion exchange resin in an acidic pH range below its point of zero charge, and a cation exchange resin above its point of zero charge, at a neutral to basic pH. In one embodiment, the supernatant pH is adjusted to a basic range, e.g., 6-7 prior to contact with the resin. In one embodiment with the use of a chelating exchange resin, depending on the adjusted pH of the supernatant and the selection of the resin, the resin may function as an anion or a cation exchange resin. In one embodiment, the resin acts as an anion exchange resin with an acidic pH, e.g., in the range of 1 to 3, and a cation exchange resin with a neutral or basic pH in the range of 6-8. In one embodiment, the supernatant pH is adjusted to a level from 1 to 1.5 prior to treatment for the removal of Group VIB metal ions such as molybdate in an exchange column functioning as an anion exchange column. The effluent from the anion exchange column is adjusted to a pH of 6 to 7 in the next column in series, wherein the same chelating exchange resin with the change in the pH functions as a cation exchange resin for the removal of a Group VIII metal ion such as $Ni^{2+}$. The effluent stream from the second exchange column (to waste treatment) contains less than 50 ppm of Group VIB and Promoter metals in one embodiment, and less than 10 ppm in a second embodiment.

In one embodiment, a cation resin is first pre-conditioned with a dilute acid, e.g., sulfuric acid to effect conversion thereof to the hydrogen form. In another embodiment, an anion resin is first conditioned with a hydroxide to facilitate the absorption of metal ions.

After loading, metal ions previously bound onto the resin can be stripped by eluting the resin with an acid, e.g., nitric acid, sulphuric acid, etc., at concentrations of about 5 to about 10% acid in one embodiment. In one embodiment, the resin is eluted with an eluant comprising but not limited to a carbonate/bicarbonate, e.g., 0.05-0.5 molar ammonium carbonate to elute any Group VIB metals thereof. In a third embodiment, a weak base anion resin is eluted with sodium hydroxide to regenerate the resin. The elution is for a sufficient of time, e.g., at least 15 minutes, and at a sufficient temperature to remove at least 95% of the previously resin-bound ions to regenerate the resin.

In one embodiment, the amount of acid used as eluant is sufficient to provide a pregnant solution (eluate) containing 5 to 25 gpl of Promoter salts such as nickel chloride, nickel sulphate, nickel nitrate, etc., depending on the acid used. In one embodiment, the pregnant solution containing Promoter metal salts, e.g., $Ni(NO_3)_2$ is routed back to the cogelation step as metal precursor feed. The treated process stream in one embodiment is routed to a chemical precipitation step for recovery of the Group VIB metals as precursor feeds for use in the co-precipitation step.

In one embodiment, cation chelated resins are employed for the removal/recovery of Group VIB metals via anion exchange. The eluate is subsequently treated by chemical precipitation to remove Group VIII Promoter metals. In another embodiment, cationic exchange is used to first extract Promoter metals, e.g., group VIII, group IIB metals such as nickel from the supernatant. In the cation-exchanger, a resin is selected to selectively exchange Promoter metals such as nickel, cobalt, and the like from an incoming level of >1000 ppm to less than 50 ppm in the effluent stream. In another embodiment, Promoter metals in the effluent stream are reduced to a level of less than 20 ppm. In one embodiment, at least 90% of the Promoter metals are removed. In a second embodiment, at least 95%. In a third embodiment, the effluent stream from the ion-exchange column contains less than 10 ppm of Promoter metals such as Ni. The type of resin used in the cation-exchange columns depends on the concentration and type of Promoter metal(s) to be removed from the supernatant. In one embodiment, the resin contains bis-picolylamine.

In one embodiment with the use of anionic exchange, at least 20 to 99% of the Group VIB metals in the process stream may be removed by the adsorption media. In another embodiment, from 60 to 85% of Group VIB metals may be removed by the resins.

Successive Filtration:

In one embodiment, filtration is employed in addition to or in place of any of the metal recovery steps described above. The supernatant in one embodiment is directed through a number of filters in series. In one embodiment, the first set of filters comprises a number of bag filters to remove metals in the supernatant. The bag filters can be staged in successive filtration capacity, e.g., the first bag is for removing metal residuals larger than 50 microns, the second bag for residual particulates over 15 microns, the third bag for 0.5 microns or larger, etc. After the bag filters, the supernatant is routed through a plurality of ultra-filters, then lastly through membranes or nano-filters to further remove metals from the supernatant for an effluent stream containing less than 1000 ppm metals in one embodiment and less than 500 ppm metals in another embodiment. The number of stages and the filter sizes employed herein are representative, simply showing successive reduction in filter sizes as metals are removed and recovered from the supernatant. Actual sizing and the number of stages depends on the size and amount of the metal residuals in the supernatant as well as subsequent effluent streams.

In one embodiment, reverse osmosis (RO) is used for reducing the metal contents to a sufficiently low level for direct discharge to the sewer. The semi-permeable membranes for use in the RO can be made of known materials, e.g., cellulose, cellulose acetate, polyamides and polysulfone. In one embodiment, carbon nanotubes can be employed for the removal of metals such as nickel compounds. The maximum pressure at which the supernatant (after a series of filtration) is fed through the feed zone is determined by the strength of the membrane in the RO. The pressure is at least 50 psi in one embodiment, at least 75 psi in a second embodiment, and at least 100 psi in a third.

Formation of Secondary Catalyst Precursor:

In one embodiment, at least a precipitant is added to the mixture of supernatant and catalyst precursor gel in solution to change the solubility of the metal residuals in the supernatant, forming another batch of catalyst precursor, e.g., secondary catalyst precursor. The precipitant can be added batch-wise or continuously to the same equipment used in preparing the catalyst precursor ("one-pot process"), or in a separate equipment. In one embodiment, the precipitant is added in an amount in stoichiometric excess of that is required to react with select metal residual(s) in the supernatant to form additional catalyst precursor. In one embodiment, the ratio of precipitant to metal ions in the metal residual(s) is at least 1.1:1 to 1.5:1. In a second embodiment, the ratio ranges from 1.5:1 to 20:1. In a third embodiment, from 2:1 to 10:1.

In one embodiment, the precipitant is added immediately after the visual appearance of any initial catalyst precursor, e.g., the appearance of haze forming. In another embodiment, the precipitant is added at least 15 minutes after the completion of the co-precipitation reaction forming catalyst precursor gel, wherein haze no longer forms, signifying the completion of the co-precipitation reaction. The precipitant changes the solubility of the mixture solution containing the metal residuals to form at least a secondary catalyst precursor. The secondary catalyst precursor can be isolated and recovered along with the initial batch of catalyst precursor.

In one embodiment, the precipitant for use in generating the secondary catalyst precursor is selected from the group of alumina, titanates, silicates and mixtures thereof. In another embodiment, the precipitant is selected from compounds of metals exhibiting amphoteric behavior. Examples of metals exhibiting amphoteric behavior include but are not limited to Ni, Zn, Al, Sn, and Nb. In one embodiment, the precipitant is selected from the group of aluminum salts and a silicate. In another embodiment, the precipitant is selected from aluminum nitrate, aluminum sulphate, zinc nitrate, ammonium aluminate, ammonium zincate, niobium pentoxide, zirconium oxide, and mixtures thereof. In another embodiment, a sulphate is added to precipitate out metals in the supernatant.

In one embodiment before the addition of precipitant, the pH of the supernatant and catalyst precursor mixture is first adjusted to a pre-select pH to facilitate the formation of a secondary catalyst precursor. The adjustment can be made with the addition of a basic or acidic chemical agent, e.g., an acid or a base such as ammonium hydroxide. In one embodiment, the pH of the mixture is adjusted to a level between 5 and 9. In another embodiment, the pH is adjust to about 7. In one embodiment, the adjustment of the pH at a pre-selected pH is for a sufficient amount of time and at a temperature such that at least a portion of the metals in the supernatant precipitate before the addition of the precipitant.

In one embodiment, the addition of the precipitant is carried out at a temperature ranging from ambient to about 80° C. and accompanied by mixing. In another embodiment, from 50-60° C. In one embodiment, after the addition of the precipitant causing the precipitation of a portion of the unreacted metal residuals, the mixture is left for the settling of the catalyst precursors for 2-8 hours. In one embodiment after the addition of the precipitant, the pH of the mixture is again adjusted to a pre-select pH to facilitate the subsequent isolation of the catalyst precursor(s). In one embodiment, the pH is optionally adjusted with the addition of ammonia for a pH of less than 3. In another embodiment, nitric acid is added to bring the pH to about 5 to 6.5, for the in-situ formation of secondary catalyst precursors such as aluminum molybdate, aluminum tungstate, and the like.

The solids containing the catalyst precursor (plus any secondary or additional catalyst precursor) can be isolated using separation means known in the art, and the supernatant is collected. In one embodiment, the supernatant contains less than 5000 ppm each of the Group VIB metals and the Promoter metals. In a second embodiment, less than 2000 ppm. In one embodiment, the supernatant is sent to waste disposal directly as an effluent stream. In yet another embodiment, the supernatant undergoes further treatment via any of the previously discussed recovery techniques, e.g., chemical precipitation treatment and the like, to reduce metal levels in the effluent to less than 50 ppm.

Evaporative Process:

In one embodiment, an evaporation step is employed separately or preferably, in combination of another recovery step, e.g., chemical precipitation, electro-coagulation, ion exchange, etc., to recover metals in the supernatant. In one embodiment evaporation is employed after an acidic precipitation step, wherein an acid such as nitric acid is added to the supernatant to precipitate out at least some of the metal ions in the metal residuals as nitrates. As nitrates typically decompose at a temperature less than 500° C., the slurry containing mixed nitrates can be concentrated and evaporated to dryness. The temperature of the mixture is raised to between 200 and 500° C. in one embodiment, and between 400-450° C. in another embodiment. At this higher temperature, nitrates are decomposed to their oxides, resulting in an admixture of respective metal oxides for further treatment, e.g., with the addition of $NH_4OH$ for subsequent use as a metal precursor feed.

Any of the metal recovery methods described above can used independently or in combinations thereof. Recovered metals can be recycled for use as part of the metal precursor feed to the co-precipitation step for making the catalyst precursor, or incorporated into the catalyst precursor as diluents. The choice of recovery technology depends on the type and concentration of metal precursor feed employed in the making of the catalyst, the waste water treatment capacity at the facility, amongst other factors.

In one embodiment, the recovery of the metal components can be carried out via ion exchange technology using anion resins, cation resins, cation chelated resins, or combinations. In a second embodiment, the recovery is primarily via electro-coagulation. In a third embodiment, the recovery process employs a combination of ion-exchange and electro-coagulation. In a fourth embodiment, chemical precipitation is used by itself. In a fifth embodiment, chemical precipitation is used in combination of any of the above recovery techniques for maximum recovery, recovering a portion of metals in the supernatant prior to treatment by other techniques, or for recovering a portion of residual metals in effluent streams from any of the other techniques. In a six embodiment, the metals are recovered as secondary catalyst precursor(s). In a seventh embodiment, the recovery is via chemical precipitation in combination with using cation chelated resins for ion exchange recovery.

In one embodiment, recovered metals account for at least 10% of the Group VIB metal precursor feed to the process. In another embodiment, recovered metals make up at least 20% of the incoming Group VIB metal precursor feed. In a third embodiment, at least 30% of the metal precursor feeds are recovered materials. In a fifth embodiment, less than 40% of the Promoter metal precursor feed for use in making the catalyst precursor is from recovered metals.

After isolation and recovery of the catalyst precursor (and secondary catalyst precursor if formed), it can be dried to remove water. Binders (or diluents), pore forming agents, shaping aid agents, etc. (collectively called "binders") as known in the art can be incorporated into the catalyst precursor before being optionally shaped into various shapes depending on the intended commercial use. The binder can be an organic binder of the cellulose ether type and/or derivatives, polyakylene glycol such as polyethylene glycol (PEG), saturated or unsaturated fatty acid or a salt thereof, a polysaccharide derived acid or a salt thereof, graphite, starch, alkali stearate, ammonium stearate, stearic acid, mineral oils, and combinations thereof. Other materials include rework material can also be added along with the peptizing agents, diluents, pore forming agents, etc. It should be noted that the binder(s) can be added to the catalyst precursor, or they can be added to the reaction mixture containing the metal precursors feed in solution, suspension or a combination thereof, in the process of forming the catalyst precursor.

In one embodiment, the catalyst precursor is thermally treated or dried at a temperature between 50° C. to 200° C. in one embodiment, and at 300° C. in another embodiment. In another embodiment, it is calcined at a temperature of at least 325° C. forming an oxide. In the final step, the catalyst precursor is sulfided forming the bulk catalyst. The sulfiding agent can be any of elemental sulfur by itself; a sulfur-containing compound which under prevailing conditions is decomposable into hydrogen sulphide; $H_2S$ by itself or $H_2S$ in any inert or reducing environment, e.g., $H_2$. In one embodiment, hydrocarbon feedstock is used as a sulfur source for performing the sulfidation of the catalyst precursor. Sulfidation of the catalyst precursor can be performed in one or more reactors during hydroprocessing.

Further details regarding the binders, the thermal treatment, and the sulfidation of the catalyst precursor are described in a number of patent applications and patents, including U.S. Pat. No. 7,544,285, U.S. Pat. No. 7,615,196, U.S. Pat. No. 6,635,599, U.S. Pat. No. 6,635,599, U.S. Pat. No. 6,652,738, U.S. Pat. No. 7,229,548, U.S. Pat. No. 7,288,182, U.S. Pat. No. 6,566,296, U.S. Pat. No. 6,860,987, U.S. Pat. No. 6,156,695, U.S. Pat. No. 6,162,350, U.S. Pat. No. 6,299,760, U.S. Pat. No. 6,620,313, U.S. Pat. No. 6,758,963, U.S. Pat. No. 6,783,663, U.S. Pat. No. 7,232,515, U.S. Pat. No. 7,179,366, U.S. Pat. No. 6,274,530; US Patent Publication Nos. US20090112011A1, US20090112010A1, US20090111686A1, US20090111685A1, US20090111683A1, US20090111682A1, US20090107889A1, US20090107886A1, US20090107883A1, US2007090024; U.S. patent application Ser. No. 12/432,719, U.S. patent application Ser. No. 12/432,721, U.S. patent application Ser. No. 12/432,723, U.S. patent application Ser. No. 12/432,727, U.S. patent application Ser. No. 12/432,728, and U.S. patent application Ser. No. 12/432,728, the relevant disclosures are included herein by reference.

Reference will be made to the figures with block diagrams schematically illustrating different embodiments of a process for making a multi-metallic catalyst with minimal waste/metals in the effluent stream.

In FIG. 1, the first step 10 is a cogelation step, which involves reacting metal precursors feed 11, e.g., promoter metal precursor feed and the Group VIB metal precursor feed to obtain a gel (or "cogel"). In the next step 20, at least 50 wt. % of the liquid (supernatant) is removed from the catalyst precursor gel (suspension) via separation processes known in the art, e.g., filtering, decanting, centrifuging, etc., for a catalyst precursor in the form of a wet filter cake having approximately 5 to 50 wt. % liquid, being generally free of water or other solvent such as methanol and the like. The supernatant 13 contains fine particles (e.g., 0.1 to 10 microns) and colloidal particles (e.g., 0.001 to 1 micron) with up to 60% of the metal precursor reagents supplied as feed to step 10 (the cogelation step). In one embodiment, supernatant 13 contains 0.1% wt. to 0.2% wt Ni, 0.2% wt to 0.8% wt Mo and 0.05% wt to 0.4% wt W In the optional chelating step 25, the catalyst precursor precipitate is treated with at least a ligating agent L, which can be the same or different from any ligating agent that may have been used/incorporated into the metal precursor feeds (reagents) in the precipitating step. Chelating can be carried out by passing organic ligating agents/solvent vapor through the filter cake, or that the filter cake can be washed in a solution containing the ligating agent. After the post precipitate chelating step, the drying step 26 can be any thermal drying technique known in the art, e.g., flash drying, belt drying, oven drying, freeze drying, fluidized bed drying, etc. In one embodiment, the drying of the catalyst precursor is performed at about 50 to 120° C. until a constant weight of the catalyst precursor is reached. In another embodiment, the drying is done at a temperature between 50° C. to 200° C. for a period ranging from ½ hour to 6 hours.

In step 30, catalyst precursors are mixed together with water and other optional materials 32, e.g., peptizing agents, pore forming agents, diluent materials 13, and/or rework material. Rework material can be in the form of filter cake material, extrudable dough and/or dry particles/pieces of precursor materials from previous runs. The mixing time depends on the type and efficiency of the mixing technique, e.g., milling, kneading, slurry mixing, dry/wet mixing, or combinations thereof and the mixing apparatus used, e.g., a pug mill, a blender, a double-arm kneading mixer, a rotor stator mixer, or a mix muller.

In step 40, a shaping aid agent (binder or diluent) is added to the mixture in a ratio of between 100:1 and 10:1 (wt. % catalyst precursor to wt. % shaping aid). Diluents can be the same as or different from any diluents that may have been previously added. Shaping step 40 can be done via any of extrusion, pressing, pelletizing, and the like.

After shaping, the catalyst precursor undergoes optional thermal treatment (calcining) in step 50, if desired. The thermal treatment can be at about 300° C. to 750° C. in a suitable atmosphere, e.g., inerts such as nitrogen or argon, or steam. In the calcination process, the catalyst precursor gets converted into an oxide precursor. In the sulfiding step 60, the catalyst precursor is converted into a bulk multi-metallic catalyst.

Although not shown, the catalyst precursor can also be sulfided in-situ, e.g., in the same reactors during hydroprocessing.

Figure 2:
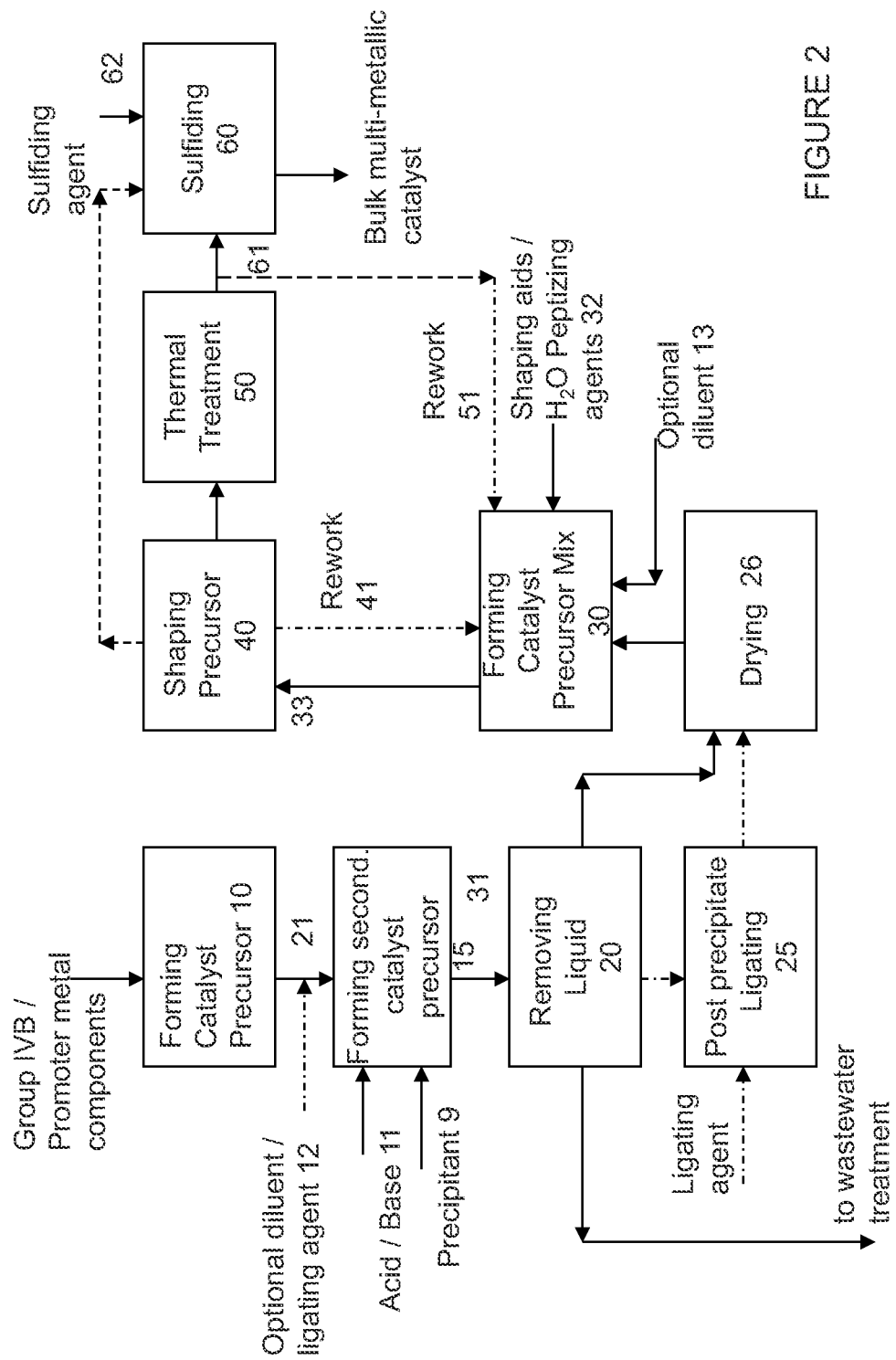
FIG. 2 provides an overview of another embodiment of a process for making a bulk multi-metallic catalyst including a step to recover metals components with the formation of additional (secondary) catalyst precursor.

FIG. 2 illustrates another embodiment wherein additional catalyst precursor is formed in addition to the previously formed catalyst precursor. In the figure, unreacted metal residuals are "recovered" by forming additional, or a secondary catalyst precursor (step 15). In this embodiment, after the formation of the catalyst precursor in step 10, at least a precipitant 9 is added to the catalyst precursor gel/supernatant mixture 21. An acid or base 11 is added to adjust the pH so that the recovered metals form a secondary precursor. The additional catalyst precursor is incorporated into the catalyst precursor previously formed (in the co-precipitation step) for recovery and further processed to form a bulk multimetallic catalyst.

Figure 3:
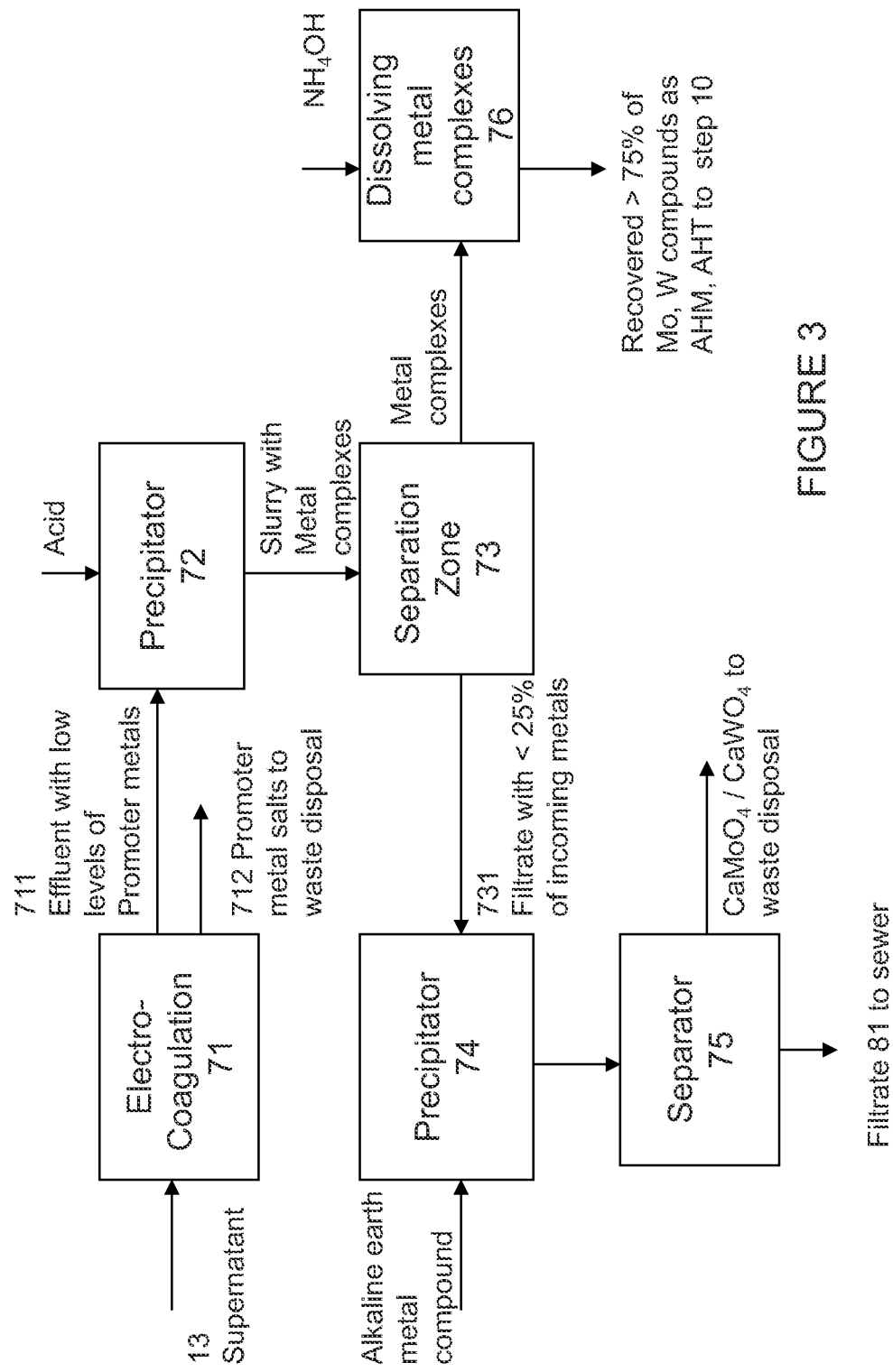
FIG. 3 is a block diagram of an embodiment employing electro-coagulation technology to recover metal components from the supernatant stream of FIG. 1.
Figure 4:
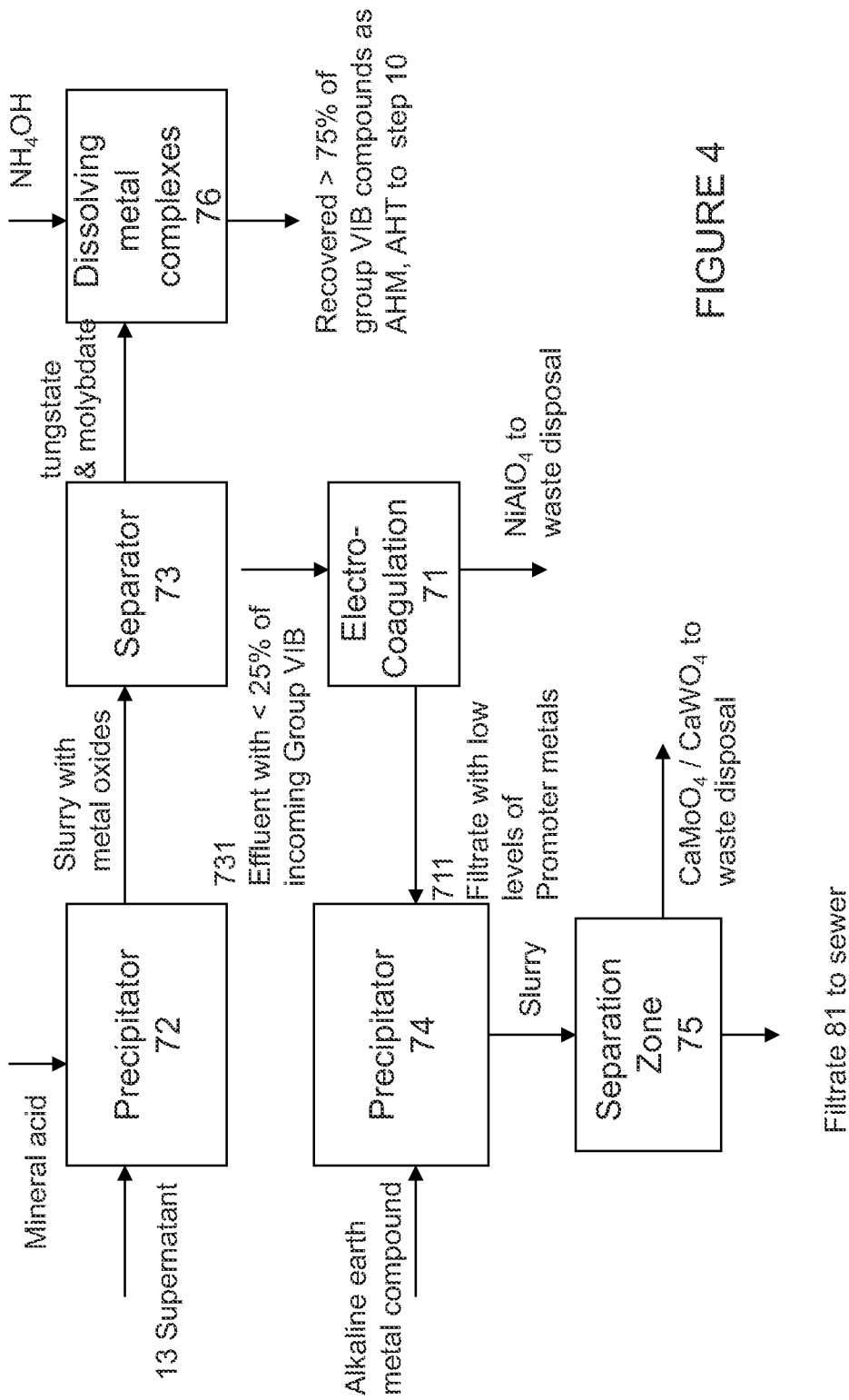
FIG. 4 is a block diagram of yet another embodiment employing electro-coagulation technology to recover metal components.

FIGS. 3-8 schematically illustrating various embodiments of the process block 70 in FIG. 1 to recover metals from the supernatant 13. In FIGS. 3-4, electro-coagulation technology is employed to recover at least 90% recovery of metal residuals from the supernatant 13. In one embodiment, recovered Group VIB metals in their anionic form are sent to the cogelation step 10 as metal precursor feed. In another embodiment, some of the Promoter metals are also recovered as ionic compounds for subsequent reuse in the cogelation step.

In FIG. 3, the supernatant 13 is first sent to electro-coagulation step 71. Promoter metal residuals in the supernatant 13, e.g., group VIII compounds, come into contact and react via oxidation/reduction with the dissolved metallic ions form in-soluble by-products such as $NiAlO_4$. The insoluble by-product Promoter metal salts 712 are removed from solution, yielding effluent stream 711 substantially free of Promoter metals (e.g., with less than 100 ppm metals). Chemical precipitation step 72 is next employed to recover/remove at least 75% of the Group VIB metals from effluent stream 711 with the addition of an acid. The pH is adjusted to cause selective precipitation of at least 75% of the Group VIB metals in the effluent stream. In one embodiment, the pH is reduced to less than 3.5 to precipitate more than 75% of the Mo and/or W soluble complexes.

After the acid precipitation step 72, the solid precipitate containing Group VIB metal complexes is separated from solution in separation zone 73 by known separation means. A basic solution, e.g., concentrated ammonium hydroxide solution, is added to dissolve the solid metal oxide precipitate in step 76, producing a saturated solution having a pH of about 5 to about 7. The solution may be cooled from its saturation temperature to room temperature wherein ammonium polymolybdate (e.g., ammonium heptamolybdate) and ammonium polytungstate (e.g., ammonium heptatungstate) precipitate out. In one embodiment, the solution is routed to the cogelation step 10 as metal precursor feed.

Remaining metal (less than 25% of incoming metals in one embodiment, and less than 5% in a second embodiment) is further removed in chemical precipitation step 74. Filtrate solution 731 is treated in precipitation zone 74 with an alkaline earth metal compound, e.g., calcium ion-containing solution containing for example from about 0.1 to 80 wt. % calcium chloride, to selectively precipitate out the Group VIB metals, e.g., molybdenum, tungsten, etc., as calcium molybdate ($CaMoO_4$), calcium tungstate ($CaWO_4$), etc. The slurry is passed on to separation zone 75 for isolation and recovery of $CaMoO_4$, $CaWO_4$, etc. for disposal, and effluent 81 for waste water treatment or sewer. The effluent 81 may be further reduced with carbon monoxide or low molecular weight oxygenated hydrocarbons, resulting in the precipitation of a hydrated chromium oxide product and a spent liquor containing alkali metal salts of carbonate or bicarbonate, which is dehydrated to yield alkali metal salts and waste water to sewer.

FIG. 4 illustrates another variation of electro-coagulation metal recovery, wherein the supernatant 13 first undergoes chemical precipitation. In the precipitation step 72 at a pre-selected pH, at least 75% of the Group VIB metals initially present are removed. Slurry containing Group VIB metal complexes goes to separation zone 73, where effluent 731 contains less than 25% of the incoming Group VIB metals is recovered and sent to an electro-coagulation step 71. In this step, electrodes form insoluble complexes with the various Promoter metals in the effluent solution 731, removing at least 75% of Promoter metals as insoluble complexes such as $NiAlO_4$ for waste disposal. The filtrate 711 containing very low levels of metals (either Group VIB metals or Promoter metals) is optionally treated in basic precipitation step 74 with a solution containing alkaline-earth metals, for example, forming a slurry. From separation zone 75, precipitate containing $CaMoO_4$ and $CaWO_4$ is sent to waste disposal, and the effluent or filtrate 81 containing less than 10 ppm of each of the Group VIB and Promoter metals can be sent to waste water treatment/sewer.

FIGS. 5-8 illustrate the use of ion-exchange technology to recover at least 90% of the metals in the supernatant. The metal recovery rate depends on a number of factors, including but not limited to the types of resins used in the ion-exchange bed, the concentration of the metals in the supernatant, the pH of the supernatant, as well as the flow velocity of the supernatant 13 through the ion-exchange resin.

Figure 5:
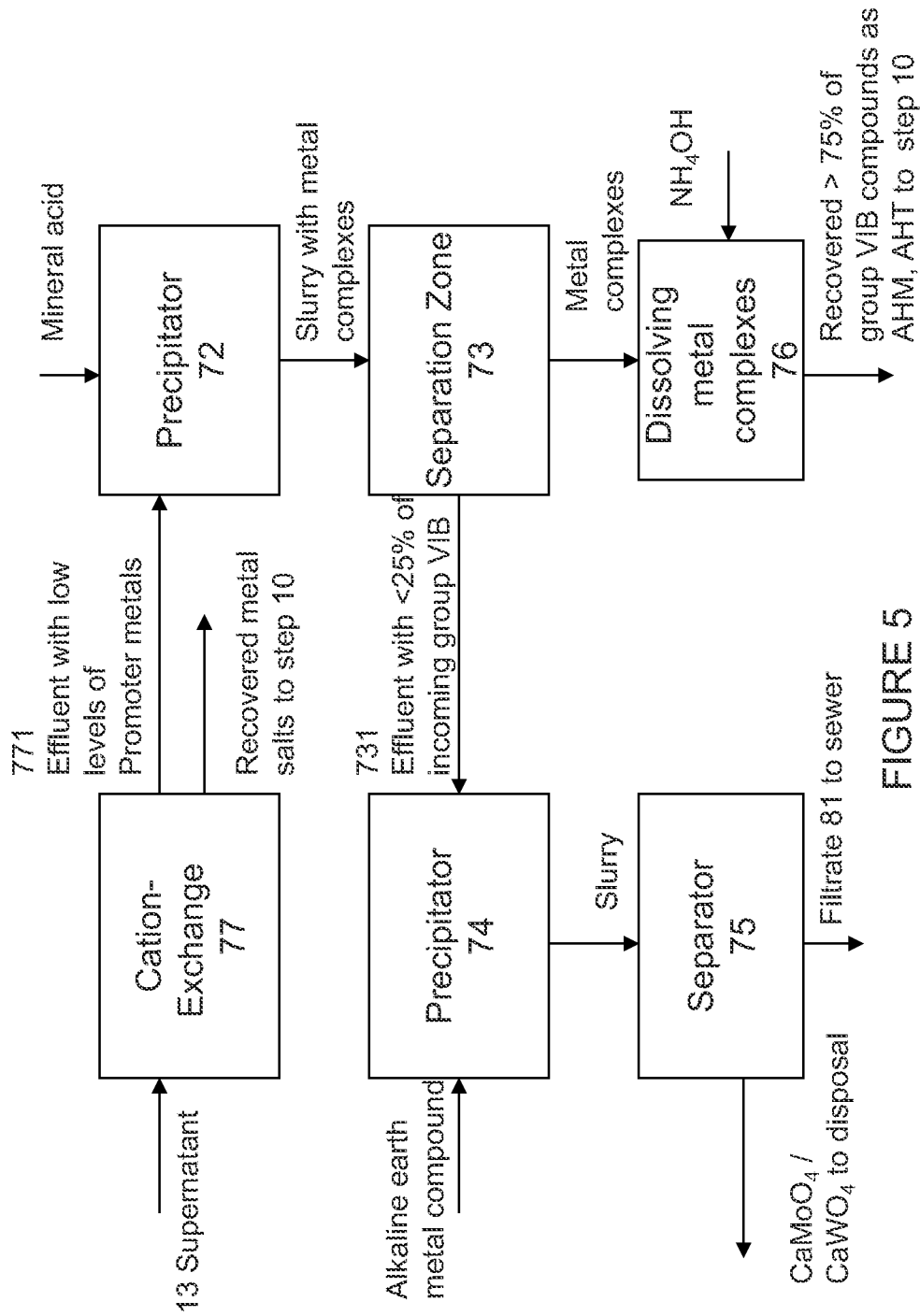
FIG. 5 is a block diagram of an embodiment employing ion-exchange technology to recover metal components from the supernatant stream.

In FIG. 5, cationic exchanger 77 is used first to extract Promoter metals, e.g., group VIII, group IIB metals such as nickel from the supernatant stream 13. In this step, a resin selectively absorbs Promoter metals such as nickel, cobalt, and the like from an incoming level of >1000 ppm to less than 50 ppm in the effluent stream 771. The effluent stream 771 undergoes chemical precipitation treatment step 72 to recover most of the Group VIB metals as oxides. The solid precipitate is separate from solution in separation zone 73. $NH_4OH$ is added in step 76 to dissolve Group VIB metal complexes for use in cogelation step 10 as metal precursor feedstock ammonium polymolybdate (e.g., ammonium heptamolybdate or AHM) and ammonium polytungstate (e.g., ammonium heptatungstate or AHT). From separation zone 73, the effluent 731 is treated with a solution containing alkaline earth metal ions, e.g., lime, in precipitator 74 to selectively precipitate out Group VIB metals, e.g., molybdenum, tungsten, etc., forming a slurry. From separation zone 75, filtrate 81 is recovered and sent to waste treatment or sewer as an effluent stream. Precipitate containing calcium molybdate/calcium tungstate can be sent to waste disposal.

Figure 6:
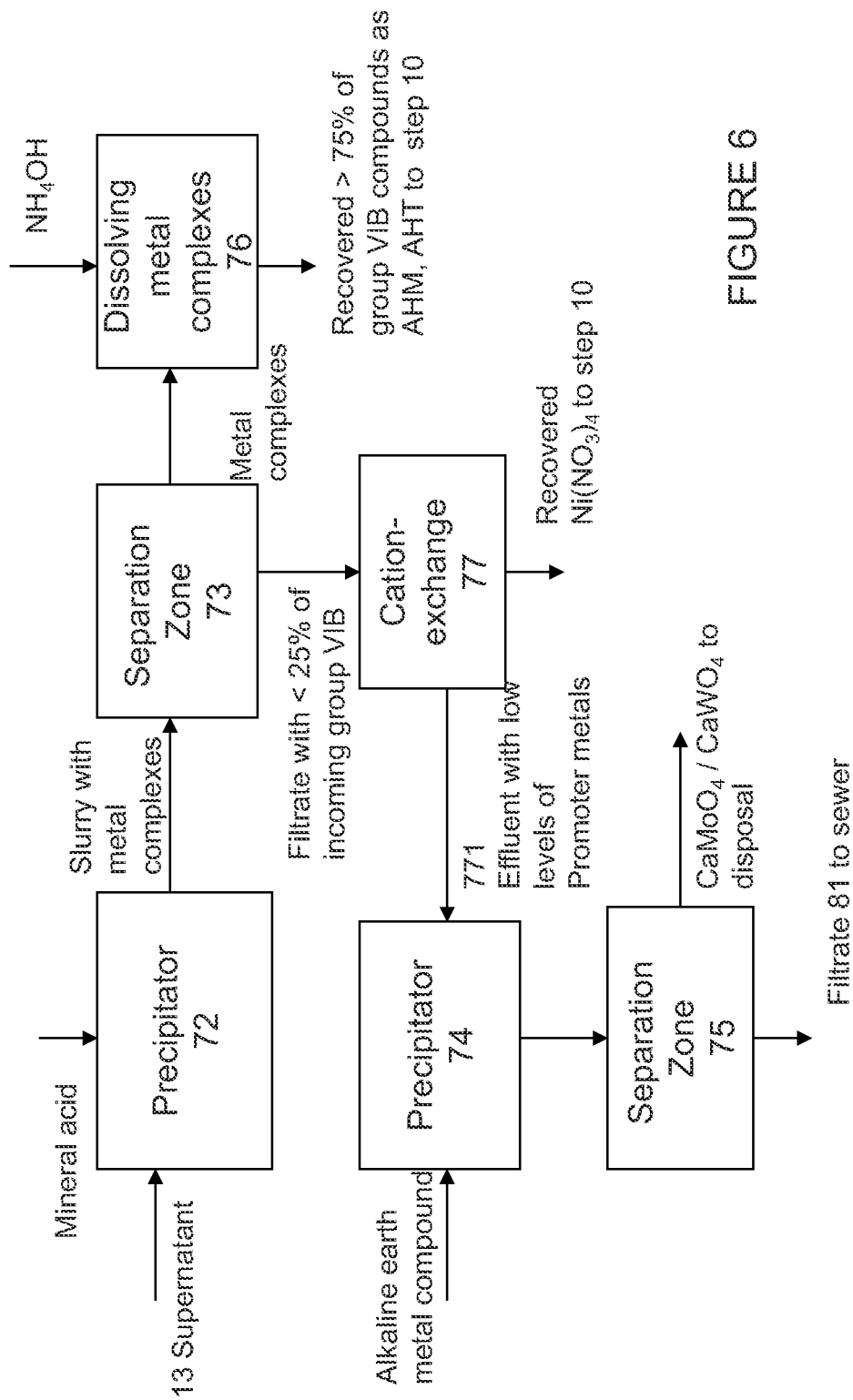
FIG. 6 is a block diagram of another embodiment employing ion-exchange technology, a combination of anionic and cationic exchangers, to recover metal components.

FIG. 6 illustrates another embodiment of metal recovery via ion-exchange. The supernatant 13 first undergoes chemical precipitation 72 at a pre-selected pH, forming a slurry containing metal complexes. In separation step 73, the metal complexes are isolated and recovered. In step 76 with further treatment with a basic solution, e.g., concentrated ammonium hydroxide solution, at least 75 mole % of the Group VIB metals initially present in the supernatant are recovered for re-use as AHM and/or AHT metal precursor feeds.

From separation zone 73, the filtrate containing less than 25% of the Group VIB metals enters cation-exchange column 77, wherein at least 90% of Promoter metals such as nickel is recovered and sent to the cogelation step 10. The effluent 771 from the cation-exchange column can be sent to waste treatment, or as shown, treated in precipitator 74 with a solution containing alkaline-earth metal ions such as lime, forming precipitates which can be isolated and recovered in step 75 for subsequent waste disposal.

Figure 7:
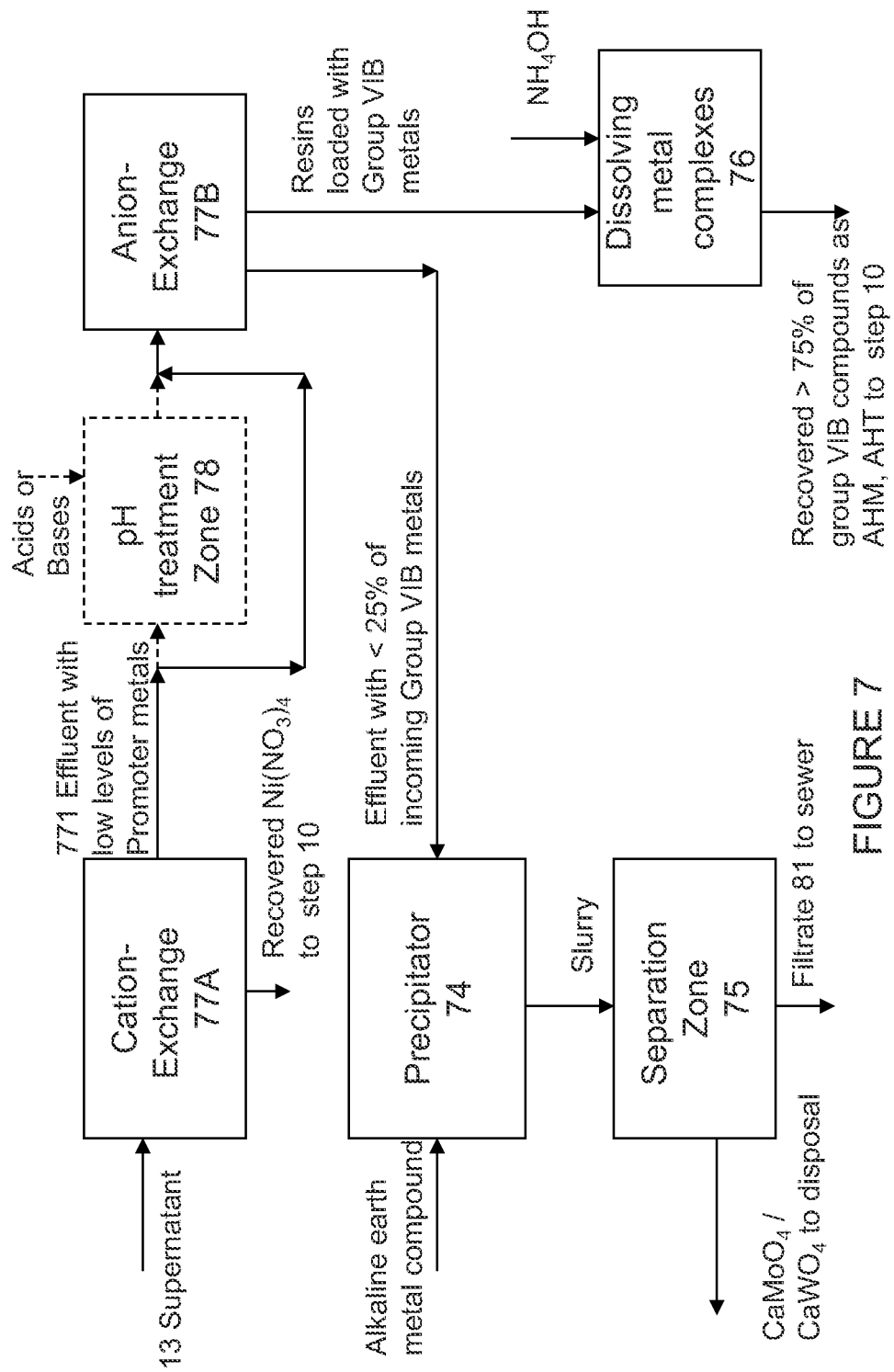
FIG. 7 is a block diagram of a third embodiment employing ion-exchange technology to recover metal components.

In FIG. 7, instead of or in addition to the chemical precipitation step 72 (as shown in FIG. 6), anion solvent extraction or anion-exchange column 77B is employed to selectively remove molybdate and tungstate anions from the effluent stream 771. In (optional) pH treatment zone 78, the effluent stream 771 is first neutralized to a pH of 3 to 6.5 by the addition of a suitable base, such as sodium hydroxide, prior to entering the anion-exchange column 77B. After loading with Group VIB metal complexes such as molybdate anions/tungstate anions, the resin in conveniently eluted in step 76 with an aqueous solution of ammonium hydroxide. The resultant eluate containing ammonium polymolybdate and/or ammonium polytungstate is recycled back to step 10 in FIG. 1 for the cogelation reaction.

The effluent stream from the anion-exchange column 77B in one embodiment is treated with a solution containing alkaline earth metal ions, e.g., lime, in precipitation zone 74 to selectively precipitate out any remaining Group VIB metals, e.g., molybdenum, tungsten, etc., which compounds are subsequently separated out in separation zone 75, for the effluent to go to waste treatment or sewer. The precipitate containing calcium molybdate/calcium tungstate can be sent to waste disposal.

As illustrated in FIG. 7, the cation-exchange step 77A precedes the anion-exchange step 77B. However, in another embodiment of ion-exchange technology (not shown) and depending on the pH of the stream to be treated, anion-exchange 77B can be first carried out to recover/remove Group VIB metal complexes from the supernatant 13 as a solution containing ammonium polymolybdate and/or ammonium polytungstate. The effluent stream from the anion-exchange column is next routed to a cation-exchange zone 77, wherein the pregnant solution (eluate) containing Promoter metal salts such as $Ni(NO_3)_2$ is recovered and re-used in the cogelation step 10. The effluent stream from the cation-exchange zone 77A can be optionally further treated with a chemical precipitation process, whether with an alkaline-earth metal solution (as in step 74) or with an acid (as in step 72), depending on the concentration and metal components contained as well as the capability of the waste water treatment facility.

Figure 8:
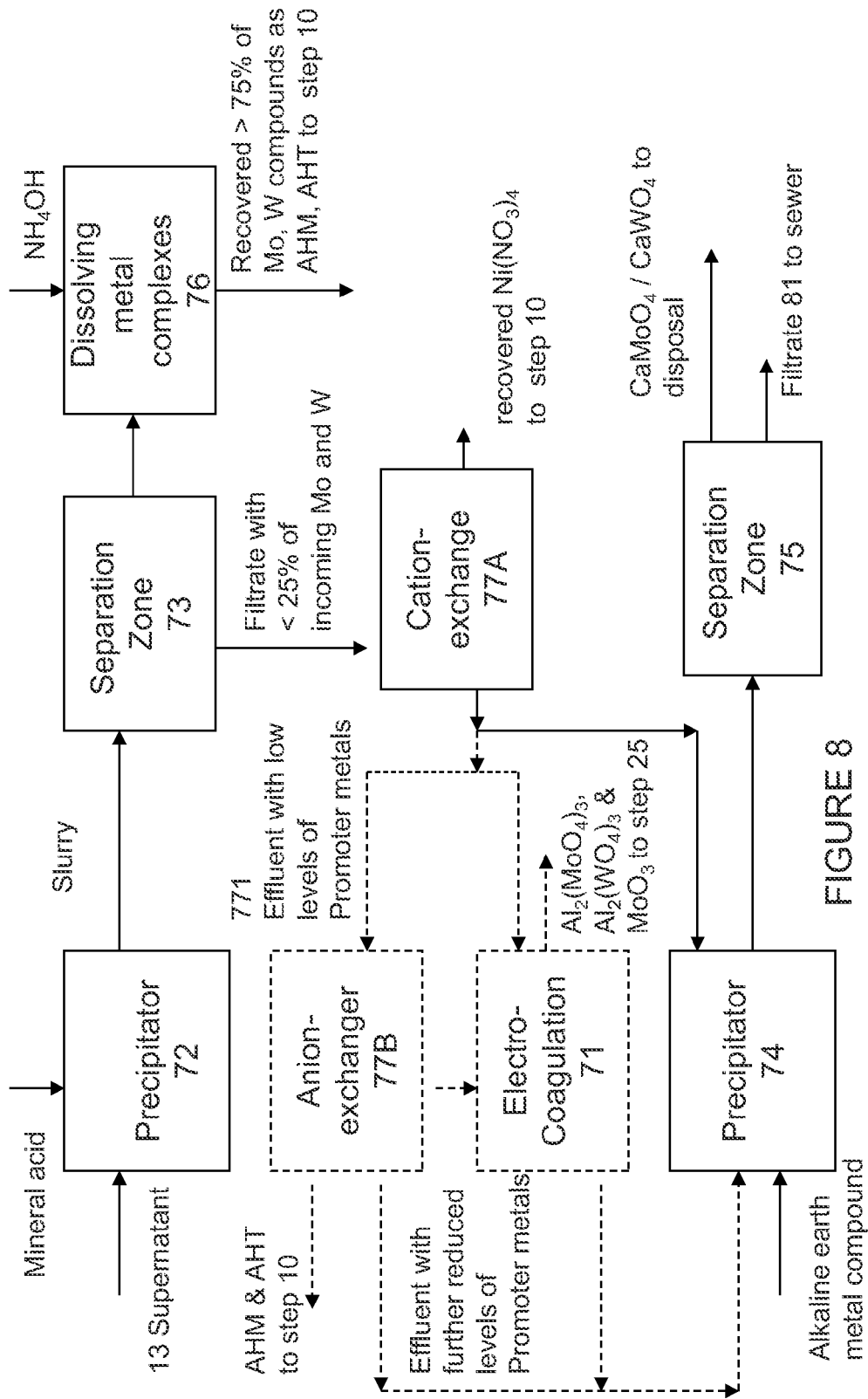
FIG. 8 is a block diagram of an embodiment employing both ion-exchange and electro-coagulation to recover metal components.

FIG. 8 illustrates the use of ion-exchange technology in combination with electro-coagulation to recover unreacted metal residuals from the supernatant stream 13. The supernatant stream 13 first undergoes chemical precipitation step 72 prior to ion-exchange treatment/electro-coagulation to remove the residual metal components. In acid precipitator 72, the supernatant stream 13 is adjusted to a pre-selected pH to precipitate out at least 75% of the Group VIB metals as oxides. After the separation step 73, the metal complexes are further treated in step 76 with a basic solution, e.g., concentrated ammonium hydroxide solution, to dissolve solid metal precipitate. Group VIB complexes such as chromates, molybdates, and the like are recovered and recycled back for use as metal precursor feed for the cogelation step 10.

From the separation zone 73, the filtrate containing essentially all of the incoming Promoter metals and less than 25% of the incoming Group VIB metals is sent to a cation exchange column 77A. In the cation-exchanger 77A, a resin is selected to selectively absorb Promoter metals such as nickel, cobalt, and the like from an incoming level of >1000 ppm to less than 50 ppm in the effluent stream 771.

After the cation-exchange step 77A, the effluent stream 771 can be sent directly to the precipitator 74 to remove most of the Group VIB metals as calcium molybdate, calcium tungstate, and the like for waste disposal. In one embodiment, the effluent stream 771 undergoes further treatment either in an anion-exchanger column 77B, an electro-coagulation vessel 71, or in both process steps configured in series to maximize the removal and recovery of metals in the effluent stream.

In another embodiment, before chemical treatment with an alkaline earth metal solution in precipitator 74, the effluent stream exiting anion-exchange zone 77 can be further treated in anion-exchange column 77B, electro-coagulation vessel 71, split into two separate streams for treatment in both (as illustrated). In another embodiment (not shown), the effluent stream can be treated in the anion-exchange column 77B and followed by metal recovery in the electro-coagulation vessel 71. If the treatment is via anion-exchange 77B, the cationic resin can be subsequently eluted (not shown) with an aqueous solution of ammonium hydroxide. The resultant eluate containing ammonium polymolybdate and/or ammonium polytungstate is recycled back to the cogelation step as metal precursor feed.

In one embodiment, with an additional metal recovery step via electro-coagulation vessel 74 and with the use of aluminum as the cathodes, aluminum forms insoluble complexes with the various Group VIB metals in the effluent stream 771, forming metal complexes such as $Al_2(MoO_4)_3$, $Al_2(WO_4)_3$, etc., which can be recovered/reused in the cogelation step 10 as metal precursor feed.

In yet another embodiment (not shown), metal removal can be carried out via ion-exchange (cationic and/or anionic exchange) in combination with electro-coagulation and chemical precipitation, either via adjustment to a pre-selected pH with the addition of an acidic or basic solution, e.g., a solution containing alkali-earth metal ions.

Use of the Catalyst Employing Recycled/Recovered Metals:

A multi-metallic catalyst prepared with recycled/recovered metals can be used in virtually all hydroprocessing processes to treat a plurality of feeds under wide-ranging reaction conditions. The catalyst with recycled/recovered metals also shows excellent catalytic activity, giving over 90% HDN (hydrodenitrogenation) conversion rate in the hydrotreating of heavy oil feedstock such as VGO.

It should be appreciated that the methods to recover/recycle metal components for use as metal precursor feed as illustrated above can be varied without departing from the essential characteristics of the invention. For example, different recovery technologies can be used individually or in combination, e.g., chemical precipitation, ion-exchange, or electro-coagulation. The selection and/or ordering of the specific recovery technology to employ depends on the concentration and composition of the supernatant with metal components to be recovered, and the waste material handling capability of the facility.

EXAMPLES

The following examples are intended to be non-limiting. In the examples, metal levels were analyzed using inductively coupled plasma (ICP).

Comparative Example

A catalyst precursor of the formula $(NH_4)\{[Ni_{2.6}(OH)_{2.08}(C_4H_2O_4^{2-})_{0.06}](Mo_{0.35}W_{0.65}O_4)_2\}$, along the line of Example 1, US Patent Publication No. US 2009-0112010A1 was prepared was prepared as follows: 52.96 g of ammonium heptamolybdate $(NH_4)_6Mo_7O_{24} \cdot 4H_2O$ was dissolved in 2.4 L of deionized water at room temperature. 73.98 g of ammonium metatungstate powder was then added to the above solution and stirred at room temperature until completely dissolved. 90 ml of concentrated $(NH_4)OH$ was added to the solution with constant stirring. A second solution was prepared containing 174.65 g of $Ni(NO_3)_2 \cdot 6H_2O$ dissolved in 150 ml of deionized water and heated to 90° C. The hot nickel solution was slowly added over 1 hr to the molybdate/tungstate solution. The resulting mixture was heated to 91° C. and stirring continued for 30 minutes. The precipitate was dispersed into a solution of 10.54 g of maleic acid dissolved in 1.8 L of deionized (DI) water and heated to 70° C. The resulting slurry was stirred for 30 minutes at 70° C. and filtered.

The supernatant from the filtration step contained 7200 ppm Mo, 3600 ppm W, and 1450 ppm Ni. The supernatant would have to undergo expensive waste treatment to comply with environmental regulations for plant discharge water.

Example 1

800 g of water was added into a heated 2 L round-bottom (RB) flask, equipped with a condenser, overhead stirrer, TC and a pH probe. 17.69 g of Ammonium heptamolybdate tetrahydrate (AHM) was added to the flask, and stirred till completely dissolved for a pH=5.16@18.9° C. 24.68 g of ammonium metatungstate (AMT) was next added, and mixture was stirred until completely dissolved for a pH of 5.13 at 18.9° C. The pH of the mixture was adjusted with ammonium hydroxide for a pH of 9.6 at 23.7° C. The mixture was heated, and the mixture pH was measured at 7.66 at 81.6° C. Separately, 58.24 g nickel nitrate hexahydrate was dissolved in 50 g of water. The nickel solution was added to the hot mixture in the previous step with vigorous stirring over 20 minutes, for a mixture having a pH of 6.17 at 79.6° C. In the next step, 2.03 g of maleic acid was added to the mixture for a pH of 5.98 at 79° C. The pH of the mixture was adjusted to 7.07 at 81.4° C. with concentrated ammonium hydroxide. The mixture was stirred continuously for 80 minutes. Catalyst precursor was formed as a gel in solution.

In the subsequent steps, more (secondary) catalyst precursor was formed with the addition of 40 g of aluminum nitrate to the catalyst precursor gel mixture and stirred for 1 hour. The pH was then adjusted 5.3 (at 80° C.) with 2.9 g of concentrated $HNO_3$. The mixture was stirred for 1 hour for a final pH of 5.39 at 80° C. The hot slurry was filtered for recovery of 816 g of filtrate and filter cake, which was subsequently dried in air. The solids were dried at 120° C. overnight in air, for ~80 g of solids. An analysis of the filtrate gave 850 ppm of Mo, 46 ppm of W and 652 ppm of Ni, for 97% metal recovery.

The filtrate was treated with an excess of hydrated slurry of CaO in water at about 80° C., forming a precipitate. Solid liquid separation was carried out to isolate the precipitate, giving an effluent with less than 20 ppm Mo and W and less than 10 ppm Ni.

Example 2

Chemical Precipitation Followed by Electro Coagulation (EC)

Example 1 was repeated. After the catalyst precursor was isolated and recovered, the supernatant was collected and analyzed showing 7149 ppm Mo, 3591 ppm W and 1433 ppm Ni. The pH of the supernatant was adjusted to 3.0 with concentrated nitric acid. About 342 g of the supernatant were placed into 500 ml EC cell equipped with 2 rectangular aluminum electrodes. Voltage of 6 V was applied to the electrodes to keep a DC current of 5 Ampere flowing through the cell for 15 minutes. The resulting slurry had pH of 5.6 at 78° C. The slurry was filtered and cooled to room temperature, giving a first filtrate containing about 86 ppm of Mo, less than 6 ppm of W and 117 ppm of Ni. The pH of the filtrate was adjusted to 7.5 with 1M NaOH. It was then treated in the EC cell under the same conditions as in the first EC step. The resulting slurry had pH of 6.8 at 79° C. Solid liquid separation was carried out forming a second filtrate which contained about 22 ppm of Mo, less than 6 ppm of W and about 5.2 ppm of Ni.

Example 3

Example 1 was repeated. After the catalyst precursor was isolated and recovered, the supernatant was collected and analyzed showing 7149 ppm Mo, 3591 ppm W and 1433 ppm Ni. The pH of the supernatant was 7.8 at 20° C. 385 g of the supernatant were placed into 500 ml EC cell equipped with 2 rectangular aluminum electrodes. Voltage of 4V was applied to the electrodes to keep a DC current of 5 A flowing through the cell for 15 minutes. The resulting slurry had pH of 7.3 at 72° C. The slurry was filtered and cooled to room temperature giving a first filtrate, containing 6733 ppm of Mo, 986 ppm of W and 20 ppm of Ni. The first filtrate was placed into a 500 ml flask equipped with overhead stirring, then its pH was adjusted to 1.4 with concentrated nitric acid. A white precipitate immediately formed as the result of the acid adjustment. The stirring was kept for 20 min and then stopped. The mixture was allowed to settle for 2 hours. Solid liquid was carried out giving a second filtrate, containing 1286 ppm of Mo, 236 ppm of W and 20 ppm of Ni. The second filtrate was treated with an excess of CaO slurry in water at 80° C. to neutralize the pH and reduce Mo and W levels to less than 20 ppm, and Ni below 10 ppm.

Example 4

Example 1 was repeated. After the catalyst precursor was isolated and recovered, the supernatant was collected and analyzed showing 7149 ppm Mo, 3591 ppm W and 1433 ppm Ni. The pH of the supernatant was 7.8 at 20° C. About 1 L of the supernatant was placed into 2 L flask equipped with overhead stirrer. The pH of the supernatant was adjusted to 1.2 with concentrated nitric acid. A white precipitate immediately formed as the result of the acid adjustment. The stirring was continued for 20 min and then stopped. The mixture was cooled in an ice bath to 10° C. and allowed to settle for 2 hours. The mixture was filtered, giving 396 g of first filtrate. A sample of the first filtrate was taken for the metal analysis by ICP, showing 901 ppm of Mo, 208 ppm of W and 1511 ppm of Ni. The pH of the first filtrate was adjusted to 7.5 with 1M NaOH. It was transferred to the EC cell as described in the Example 3, and treated for 15 min under the cell DC current of 5 Ampere at 6 V, giving a slurry with pH of 6.7 at 81° C. The slurry was filtered, giving a second filtrate, which contained 115 ppm of Mo, 20 ppm of W and 2 ppm of Ni. The second filtrate was treated with an excess of CaO slurry in water at 80° C. to reduce Mo and W levels below 20 ppm.

Example 5

Example 1 was repeated. After the catalyst precursor was isolated and recovered giving a supernatant. After recovery, the supernatant was analyzed, showing 3782 ppm Mo, 750 ppm W and 1868 ppm Ni. The pH was 7.8 at 20° C. 1 L of the filtrate supernatant was placed into 2 L flask equipped with overhead stirrer. The pH of the filtrate was adjusted to 1.2 with concentrated nitric acid. A white precipitate immediately formed as the result of the acid adjustment. The stirring was continued for 20 min. The mixture was cooled in an ice bath to 10° C. and allowed to settle for 2 hours. The mixture was filtered, giving a first filtrate. The first filtrate was analyzed showing to contain 901 ppm of Mo, 208 ppm of W and 1511 ppm of Ni.

200 ml of the first filtrate was contacted with 20 ml of Amberlite™ 748 ion exchange resin in H+ form. The mixture was placed into a 500 ml bottle and shaken for 2 hours. The mixture was filtered, giving a second filtrate. The second filtrate was analyzed showing less <20 ppm of Mo and W and 1426 ppm of Ni. The pH of the second filtrate was adjusted to 6.5 with concentrated solution of ammonium hydroxide forming a slurry. 200 ml of the slurry mixture was brought into contact with 20 ml of Amberlite™ 748 ion exchange resin in $NH_4+$ form. The mixture was placed into a 500 ml bottle and shaken for 2 hours. It was filtered as in previous step to obtain resin-free liquid as a third filtrate. In ICP metal analysis, the third filtrate shows less than 3 ppm Ni.

Mo and W were recovered by regenerating the resin with ammonium hydroxide solution, followed by ion exchange with sulfuric acid to convert the resin to H+ form. Ni was recovered by washing the resin with a solution of sulfuric acid, followed by ion exchange with ammonium hydroxide to obtain ammonium form of the resin. It should be noted here that due to its weak acid nature, the resin acts as an anion exchange resin in a acidic pH range below its point of zero charge, and as a cation exchange resin above the point of zero charge at a neutral to basic pH.

Example 6

In this example, the effluent was acid treated, followed by a cation exchange and/or lime treatment. Example 1 was repeated and supernatant from the catalyst precursor isolation step was collected and analyzed, showing 3782 ppm Mo, 750 ppm W and 1868 ppm Ni. The pH of the supernatant was 7.8 at 20° C. 1 L of the filtrate was placed into 2 L flask equipped with overhead stirrer. The pH of the supernatant was adjusted to 1.2 with concentrated nitric acid. A white precipitate immediately formed as the result of the acid adjustment. The stirring was continued for 20 min. The mixture was cooled in an ice bath to 10° C. and allowed to settle for 2 hours. The mixture was filtered, giving a first filtrate. A sample of the first filtrate was taken for the metal analysis by ICP. It contained 901 ppm of Mo, 208 ppm of W and 1511 ppm of Ni. 200 ml of the first filtrate was contacted with 40 ml of Dowex G-26H ion exchange resin in H+ form. The mixture was placed into a 500 ml polypropylene bottle and shaken for 2 hours. The slurry was filtered, giving a second filtrate which was analyzed, showing 890 ppm Mo, 201 ppm W and 573 ppm Ni.

The second filtrate was treated with an excess of CaO slurry in water at 80 C to reduce Mo and W levels below 20 ppm and Ni below 10 ppm. The resin was regenerated with an acid according to manufacturer's suggested procedures and re-used. It should be noted that lime treatment may not be necessary if metal recovery is deemed sufficient after acid precipitation.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for forming a bulk hydroprocessing catalyst, the method comprises:
    co-precipitating at reaction conditions at least a Group VIB metal precursor feed and at least a Promoter metal precursor feed selected from Group VIII, Group IIB, Group IIA, Group IVA and combinations thereof, to form a mixture comprising a catalyst precursor;
    isolating the catalyst precursor from the mixture, forming a supernatant containing at least a Promoter metal residual and at least a Group VIB metal residual in a total amount of at least 10 mole % of the metal precursor feeds;
    supplying the supernatant to a reactor vessel having a plurality of electrodes having a positive or a negative charge provided by a power supply, wherein the electrodes dissolve in water generating an electrode dissolution product;
    reacting the electrode dissolution product with at least one of the metal residuals, forming a slurry containing insoluble metal compounds;
    isolating the insoluble metal compounds from the slurry, forming a first effluent stream containing less than 50 mole % of metal ions in the metal residuals;
    treating the first effluent stream to recover at least 80 mol % of the metal ions to form at least a metal precursor feed;
    recycling the metal precursor feed to the co-precipitating step; and
    sulfiding the catalyst precursor forming the bulk catalyst.

2. The process of claim 1, wherein the recovering of 80 mole % of at least one of the metal residuals from the first effluent stream comprises treating the first effluent stream by chemical precipitation, forming a second effluent stream contains less than 2000 ppm of at least one of the metal residuals.

3. The process of claim 1, wherein the electrodes are substantial parallel electrolytic plates.

4. The process of claim 1, wherein the electrodes are aluminum.

5. The process of claim 4, wherein the electrodes sacrifice aluminum ions into the supernatant forming at least an aluminum complex with at least one of the Promoter metal residual.

6. The process of claim 5, wherein the Promoter metal residual comprises at least a nickel compound and the insoluble metal compounds comprise $NiAlO_4$.

7. The process of claim 1, wherein the first effluent stream contains less than 20 mole % of the Promoter metal residual.

8. The process of claim 7, wherein the first effluent stream contains less than 50 ppm of the Promoter metal residual.

9. The process of claim 1, wherein the Group VIB metal residual comprises at least a Mo compound and a W compound.

10. The process of claim 2, wherein the treatment of the first effluent stream comprises adding at least an additive selected from the group of a base, an acid, a sulfide-containing compound, and mixtures thereof under mixing conditions for a sufficient amount of time to precipitate at least a portion of at least one of the metal residuals at a first pre-selected pH.

11. The process of claim 10, wherein the additive is selected from the group of nitric acid and sulphuric acid and the first pre-selected pH is less than 3.

12. The process of claim 10, further comprising isolating and recovering the precipitate forming a second effluent stream comprising less than 25 mole % of at least one of the metal residuals.

13. The process of claim 12, further comprising acidifying the second effluent stream to a pH of less than 6.5.

14. The process of claim 13, further comprising adding at least a calcium compound to the second effluent stream under mixing conditions forming a slurry containing at least a calcium salt, wherein the molar ratio of added calcium compound to Group VIB metal residual is 2/1 to 50/1.

15. The process of claim 14, wherein the calcium salt comprises at least one of $CaMoO_4$ and $CaWO_4$.

16. The process of claim 14, further comprising isolating and recovering the calcium salt, forming an effluent stream containing less than 500 ppm metals.

17. The process of claim 1, further comprising calcining the catalyst precursor at a temperature of at least 300° C. before the sulfidation step.

18. The process of claim 17, wherein the calcination is at a temperature of at least 325° C. for the catalyst precursor to have the formula $(X)_b(Mo)_c(W)_dO_z$; wherein X is Ni or Co, the molar ratio of b:(c+d) is 0.5/1 to 3/1, the molar ratio of c:d is >0.01/1, and z=[2b+6(c+d)]/2.

19. The process of claim 1, further comprising drying the catalyst precursor at a temperature of 200° C. or less before the sulfidation step, wherein the catalyst precursor has the formula $A_v[(M^P)(OH)_x(L)^n{}_y]_z(M^{VIB}O_4)$, wherein A is at least one of an alkali metal cation, an ammonium, an organic ammonium and a phosphonium cation, $M^P$ is selected from the group of Group VIII, Group IIB, Group IIA, Group IVA and combinations thereof, P is oxidation state with $M^P$ having an oxidation state of either +2 or +4 depending on the selection of $M^P$, L is at least a ligating agent L having an charge n<=0;

$M^{VIB}$ is at least a Group VIB metal having an oxidation state of +6, $M^P$:$M^{VIB}$ has an atomic ratio of 100:1 to 1:100;

v−2+P*z−x*z+n*y*z=0; and

0<y≤−P/n; 0<x≤P; 0<v≤2; 0<z.

20. In a process for forming a bulk hydroprocessing catalyst, the process comprising: co-precipitating at reaction conditions at least one of a Group VIB metal precursor feed and at least a Promoter metal precursor feed selected from Group VIII, Group IIB, Group IIA, Group IVA and combinations thereof, to form a mixture comprising a catalyst precursor; isolating the catalyst precursor from the mixture, forming a supernatant containing at least a Promoter metal residual and at least a Group VIB metal residual in an amount of at least 10 mole % of the metal precursor feeds; and sulfiding the catalyst precursor forming the bulk catalyst; the improvement comprising:

supplying the supernatant to a reactor vessel having a plurality of electrodes having a positive or a negative charge provided by a power supply;

reacting the electrodes with at least one of the metal residuals, forming a slurry containing insoluble metal compounds;

recovering the insoluble metal compounds, forming a first effluent stream containing less than 50 mole % of at least one of the Promoter metal residual and a Group VIB metal residual; and treating the first effluent stream to recover at least 80 mol % of the metal ions to form at least a metal precursor feed; and recycling the at least a metal precursor feed to the co-precipitating step.

21. The process of claim 20, wherein the Promoter metal residual comprises at least a Ni compound and the Group VIB metal residual comprises W and Mo compounds.

22. The process of claim 21, wherein the electrodes comprise aluminum and the first effluent stream comprises less than 50 ppm Ni.

23. The process of claim 20, wherein treating the first effluent stream comprises adding to the first effluent stream a mineral acid for a pH of less than 3 to precipitate the Group VIB metal residual as metal complexes comprising molybdate, tungstate, and mixtures thereof.

24. The process of claim 23, further comprising treating the metal complexes with ammonium hydroxide to recover a slurry containing ammonium heptamolybdate, ammonium heptatungstate, or mixtures thereof.

25. The process of claim 24, further comprising isolating and recovering ammonium heptamolybdate, ammonium heptatungstate, or mixtures thereof as metal precursor feed for the co-precipitating step, forming a second effluent stream.

26. The process of claim 25, further comprising adding at least a calcium compound to the second effluent stream under mixing conditions forming a slurry containing at least a calcium salt, wherein the molar ratio of added calcium to Group VIB metal is 2/1 to 50/1.

27. The process of claim 26, wherein the calcium salt comprises at least one of $CaMoO_4$ and $CaWO_4$.

28. The process of claim 27, further comprising isolating and recovering the calcium salt, forming a third effluent stream containing less than 50 ppm metals.

* * * * *